United States Patent
Shao et al.

(10) Patent No.: US 12,040,904 B2
(45) Date of Patent: Jul. 16, 2024

(54) CODEBOOK PROCESSING METHOD AND APPARATUS

(71) Applicant: HUAWEI TECHNOLOGIES CO., LTD., Shenzhen (CN)

(72) Inventors: Jiafeng Shao, Beijing (CN); Lei Guan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 406 days.

(21) Appl. No.: 17/401,530

(22) Filed: Aug. 13, 2021

(65) Prior Publication Data

US 2021/0376961 A1  Dec. 2, 2021

Related U.S. Application Data

(63) Continuation of application No. PCT/CN2020/074726, filed on Feb. 11, 2020.

(30) Foreign Application Priority Data

Feb. 15, 2019 (CN) .......................... 201910118165.1

(51) Int. Cl.
*H04L 1/1812* (2023.01)
*H04L 1/1867* (2023.01)

(52) U.S. Cl.
CPC .......... *H04L 1/1819* (2013.01); *H04L 1/1887* (2013.01); *H04L 1/1896* (2013.01)

(58) Field of Classification Search
CPC ... H04L 1/1861; H04L 5/0094; H04L 5/0055; H04L 1/1896; H04L 1/1854; H04L 1/1819; H04L 1/1887
See application file for complete search history.

(56) References Cited

U.S. PATENT DOCUMENTS

| | | | |
|---|---|---|---|
| 2008/0086669 A1 | 4/2008 | Cheng et al. | |
| 2016/0204905 A1 | 7/2016 | Lee et al. | |
| 2017/0134140 A1 | 5/2017 | Park | |
| 2017/0331596 A1 | 11/2017 | Guan et al. | |
| 2018/0006791 A1 | 1/2018 | Marinier et al. | |
| 2018/0278382 A1* | 9/2018 | Ji | H04L 1/1874 |

(Continued)

FOREIGN PATENT DOCUMENTS

| | | |
|---|---|---|
| CN | 102255694 A | 11/2011 |
| CN | 104734813 A | 6/2015 |

(Continued)

OTHER PUBLICATIONS

3GPP TS 38.212 V15.4.0 (Dec. 2018), 3rd Generation Partnership Project; Technical Specification Group Radio Access Network; NR; Multiplexing and channel coding (Release 15); 100 pages.

(Continued)

*Primary Examiner* — Chi Ho A Lee
(74) *Attorney, Agent, or Firm* — Rimon PC

(57) ABSTRACT

Embodiments of this application provide a codebook processing method and apparatus, and relate to the field of communication technologies. The method is applied to a terminal device, and the method includes: obtaining a transmission parameter corresponding to a first hybrid automatic repeat request HARQ codebook set, where the first HARQ codebook set includes a first HARQ codebook, the first HARQ codebook includes HARQ information corresponding to M first channels, M is an integer, and the transmission parameter corresponding to the first HARQ codebook set is greater than a target threshold; and generating a second HARQ codebook based on the first HARQ codebook, where a quantity of bits of the second HARQ codebook is less than a quantity of bits of the first HARQ codebook, or deleting the first HARQ codebook from the first HARQ codebook set.

18 Claims, 3 Drawing Sheets

(56) References Cited

U.S. PATENT DOCUMENTS

| | | | | |
|---|---|---|---|---|
| 2020/0266954 | A1* | 8/2020 | Salah | H04W 72/542 |
| 2020/0304245 | A1* | 9/2020 | Zhou | H04B 7/0482 |
| 2020/0403751 | A1* | 12/2020 | Baldemair | H04L 5/0055 |
| 2021/0050948 | A1* | 2/2021 | Gao | H04W 72/23 |
| 2021/0075561 | A1* | 3/2021 | Baldemair | H04L 1/1614 |
| 2021/0281458 | A1* | 9/2021 | Takeda | H04L 1/1854 |
| 2021/0294190 | A1* | 9/2021 | Tsuchiya | H05K 7/2039 |
| 2021/0314101 | A1* | 10/2021 | Zhou | H04L 1/1861 |
| 2022/0085920 | A1* | 3/2022 | Baldemair | H04L 1/1861 |
| 2022/0109521 | A1* | 4/2022 | Falahati | H04L 1/1664 |

FOREIGN PATENT DOCUMENTS

| | | | |
|---|---|---|---|
| CN | 105580303 | A | 5/2016 |
| CN | 106130701 | A | 11/2016 |
| CN | 106465378 | A | 2/2017 |
| CN | 107409014 | A | 11/2017 |
| CN | 108292974 | A | 7/2018 |
| CN | 108809610 | A | 11/2018 |
| EP | 3343987 | A1 | 7/2018 |

OTHER PUBLICATIONS

3GPP TS 38.213 V15.4.0 (Dec. 2018), 3rd Generation Partnership Project; Technical Specification Group Radio Access Network; NR; Physical layer procedures for control (Release 15); 104 pages.

3GPP TS 38.331 V15.4.0 (Dec. 2018), 3rd Generation Partnership Project; Technical Specification Group Radio Access Network; NR; Radio Resource Control (RRC) protocol specification (Release 15); 473 pages.

3GPP TS 38.211 V15.4.0 (Dec. 2018), 3rd Generation Partnership Project; Technical Specification Group Radio Access Network; NR; Physical channels and modulation (Release 15); 96 pages.

3GPP TSG RAN WG1 Meeting #90bis,R1-1718707,UE-based HARQ-ACK bundling for NR,Sequans Communications, Prague, CZ, Oct. 9-13, 2017,total 5 pages.

Mohammed Jabi,et al: Adaptive Cross-Packet HARQ May 2017 total 14 pages.

3GPP TSG RAN WG1 Meeting NR#3, R1-1716005,HARQ Management and Feedback,Samsung,Nagoya, Japan, Sep. 18-21, 2017,total 10 pages.

3GPP TS 38.214 V15.3.0 (Oct. 2018), 3rd Generation Partnership Project; Technical Specification; 5G; NR; Physical layer procedures for data (Release 15), ETSI TS 138 214 v. 15.3.0; 99 pages.

Xiaokun,sun,"The Research of HARQ Technique in the LTE Uplink and Its Implementation in the MAC",2010,total 68 pages.

3GPP TSG RAN WG1 Meeting #84,R1-160286,Open issues on HARQ-ACK transmission for eCA ,Huawei, HiSilicon, St Julian s, Malta, Feb. 15-19, 2016,total 6 pages.

OPPO, HARQ enhancements for NR-U. 3GPP TSG RAN WG1 Ad-Hoc Meeting 1901, Taipei, Jan. 21-25, 2019, R1-1900274, 5 pages.

* cited by examiner

CODEBOOK PROCESSING METHOD AND APPARATUS

CROSS-REFERENCE TO RELATED APPLICATIONS

This application is a continuation of International Application No. PCT/CN2020/074726, filed on Feb. 11, 2020, which claims priority to Chinese Patent Application No. 201910118165.1, filed on Feb. 15, 2019. The disclosures of the aforementioned applications are hereby incorporated by reference in their entireties.

TECHNICAL FIELD

This application relates to the field of communication technologies, and in particular, to a codebook processing method and apparatus.

BACKGROUND

Mobile communication technologies have profoundly changed people's life, but people's pursuit of a mobile communication technology with higher performance has never ceased. To cope with explosive growth of mobile data traffic, massive connections of mobile communication devices, and various emerging new services and application scenarios in the future, a fifth generation (5G) mobile communication system accordingly emerges. The International Telecommunication Union (ITU) defines three major types of services for 5G and future mobile communication systems: an enhanced mobile broadband (eMBB) service, an ultra-reliable and low-latency communications (URLLC) service, and a massive machine-type communications (mMTC) service. The URLLC service is mainly characterized by ultra-high reliability, a low latency, a relatively small amount of transmitted data, and burstiness. The mMTC service is mainly characterized by a large quantity of network-connected devices, a relatively small amount of transmitted data, and insensitivity of data to a transmission latency. The eMBB service is mainly characterized by a large amount of transmitted data and a high transmission rate.

In a 5G mobile communication system, a network device may send data to user equipment (UE) on a physical downlink shared channel (PDSCH). After receiving the PDSCH, the UE may decode the data, and send, based on a decoding result, hybrid automatic repeat request (HARQ) information to the network device on a physical uplink control channel (PUCCH) or physical uplink shared channel (PUSCH) that corresponds to the PDSCH, where the HARQ information is an acknowledgement (ACK) message or a negative acknowledgement (NACK) message. A plurality of pieces of HARQ information on the PUCCH or the PUSCH may also be referred to as a HARQ codebook. When receiving, on the PUCCH or the PUSCH, the NACK message sent by the UE, the network device may resend the data to the UE, to ensure reliable transmission of encoded data.

Based on a conventional technology, when a service on a PUCCH or a PUSCH has a relatively large quantity of pieces of HARQ information, transmission efficiency of another service that is more important and that is on the PUCCH or the PUSCH is affected. For example, when an eMBB service on the PUCCH or the PUSCH has a relatively large quantity of pieces of HARQ information, transmission efficiency of a URLLC service that has a relatively high latency requirement is affected. Therefore, how to improve transmission efficiency of another service that is more important and that is on the PUCCH or the PUSCH is an urgent problem to be resolved.

SUMMARY

Embodiments of this application provide a codebook processing method and apparatus, to avoid, when a service has a relatively large quantity of HARQ information, affecting transmission efficiency of another type of service that is more important. Technical solutions are as follows:

According to a first aspect, a codebook processing method is provided. The method is applied to a terminal device, and the method includes:

obtaining a transmission parameter corresponding to a first hybrid automatic repeat request HARQ codebook set, where the first HARQ codebook set includes a first HARQ codebook, the first HARQ codebook includes HARQ information corresponding to M first channels, M is an integer, and the transmission parameter corresponding to the first HARQ codebook set is greater than a target threshold; and generating a second HARQ codebook based on the first HARQ codebook, where a quantity of bits of the second HARQ codebook is less than a quantity of bits of the first HARQ codebook; or deleting the first HARQ codebook from the first HARQ codebook set.

In a possible implementation, the generating a second HARQ codebook based on the first HARQ codebook includes:

determining, based on HARQ information corresponding to a first channel included in each of N first channel groups, HARQ information corresponding to each first channel group, where the N first channel groups are obtained by grouping the M first channels based on first parameters or first parameter sets; and generating the second HARQ codebook based on HARQ information corresponding to at least one of the N first channel groups.

In this embodiment of this application, the M first channels are grouped into the N first channel groups, so that a quantity of bits of the HARQ information corresponding to the obtained N first channel groups is less than a quantity of bits of the HARQ information corresponding to the M first channels. Therefore, the first HARQ codebook is reduced, and a transmission parameter of a second HARQ codebook set is less than or equal to the target threshold.

In a possible implementation, the N first channel groups include a target first channel group, and the determining, based on HARQ information corresponding to a first channel included in each first channel group, HARQ information corresponding to each first channel group includes:

if HARQ information corresponding to each first channel included in the target first channel group is an acknowledgement ACK, HARQ information corresponding to the target first channel group is an ACK; or if HARQ information corresponding to any first channel included in the target first channel group is a negative acknowledgement NACK, HARQ information corresponding to the target first channel group is a NACK.

In this embodiment of this application, according to this method, a base station may still perform repeat transmission when all HARQ information is ACKs indicating correct receiving, and retransmission is performed only when a transmission error occurs, thereby improving transmission efficiency.

In a possible implementation, the first parameters corresponding to the M first channels include at least one of the following:
    downlink control information DCI for scheduling the first channels;
    frequency domain resources occupied by the first channels;
    time domain resources occupied by the first channels; or information carried on the first channels.

In a possible implementation, the M first channels include a target first channel that carries HARQ information corresponding to a plurality of code block groups, a transport block corresponding to the target first channel includes the plurality of code block groups, and the generating a second HARQ codebook based on the first HARQ codebook includes:
    generating the second HARQ codebook based on HARQ information corresponding to the target first channel that carries HARQ information corresponding to the transport block.

In this embodiment of this application, feedback is performed based on the plurality of code block groups, and a quantity of pieces of HARQ information corresponding to one transport block is the same as a quantity of code block groups. For example, N pieces of HARQ information are fed back for N code block groups. This may be understood as: For transport block-based feedback, only one piece of HARQ information is fed back for one transport block. In this way, the first HARQ codebook is reduced, and a transmission parameter of a second HARQ codebook set is less than or equal to the target threshold.

In a possible implementation, the generating a second HARQ codebook based on the first HARQ codebook includes:
    determining, based on second parameters corresponding to the M first channels, priorities of the HARQ information corresponding to the M first channels that is included in the first HARQ codebook; and
    generating the second HARQ codebook based on the priorities of the HARQ information corresponding to the M first channels.

In a possible implementation, the generating the second HARQ codebook based on the priorities of the HARQ information corresponding to the M first channels includes:
    discarding, in ascending order of the priorities of the HARQ information corresponding to the M first channels that is included in the first HARQ codebook, HARQ information corresponding to S first channels in the M first channels, and generating the second HARQ codebook, where the second HARQ codebook includes HARQ information corresponding to a first channel in the M first channels other than the S first channels; or
    generating the second HARQ codebook in descending order of the priorities of the HARQ information corresponding to the M first channels that is included in the first HARQ codebook, where HARQ information corresponding to S first channels that is in the first HARQ codebook is reserved in the second HARQ codebook, where
    M is greater than S.

In a possible implementation, the generating the second HARQ codebook based on HARQ information corresponding to at least one of the N first channel groups includes:
    determining, based on first parameters corresponding to the N first channel groups, priorities of the HARQ information corresponding to the N first channel groups; and
    generating the second HARQ codebook based on the priorities of the HARQ information corresponding to the N first channel groups.

In a possible implementation, the generating the second HARQ codebook based on the priorities of the HARQ information corresponding to the N first channel groups includes:
    discarding, in ascending order of the priorities of the HARQ information corresponding to the N first channel groups that is included in the first HARQ codebook, HARQ information corresponding to Z first channel groups in the N first channel groups, and generating the second HARQ codebook, where the second HARQ codebook includes HARQ information corresponding to a first channel group in the N channel groups other than the Z first channel groups; or
    generating the second HARQ codebook in descending order of the priorities of the HARQ information corresponding to the N first channel groups that is included in the first HARQ codebook, where HARQ information corresponding to Z first channel groups that is in the first HARQ codebook is reserved in the second HARQ codebook, where
    N is greater than Z.

In this embodiment of this application, determining is first performed in groups, and then discarding is performed based on the priorities of the HARQ information if corresponding HARQ information in the first HARQ codebook is still greater than the target threshold. Important HARQ information is reserved while the first HARQ codebook is reduced, thereby improving system transmission efficiency.

In a possible implementation, the second parameters corresponding to the M first channels include at least one of the following:
    offsets corresponding to the first channels, where the offsets are offsets from time domain resources on which the first channels are located to time domain resources on which the HARQ information corresponding to the first channels is located;
    frequency domain resources occupied by the first channels;
    downlink symbol configuration indexes corresponding to the first channels; or
    time domain resources occupied by the first channels.

In a possible implementation, the transmission parameter corresponding to the first HARQ codebook set is:
    the quantity of bits of the first HARQ codebook;
    a sum of quantities of bits of all HARQ codebooks in the first HARQ codebook set;
    a ratio of the quantity of bits of the first HARQ codebook to a sum of quantities of bits of all HARQ codebooks in the first HARQ codebook set;
    a ratio of a time-frequency resource occupied by the first HARQ codebook to a time-frequency resource occupied by the first HARQ codebook set;
    a ratio of a time-frequency resource occupied by the first HARQ codebook to a time-frequency resource occupied by an uplink channel that carries the first HARQ codebook set; or
    a ratio of a time-frequency resource occupied by the first HARQ codebook set to a time-frequency resource occupied by an uplink channel that carries the first HARQ codebook set.

In a possible implementation, the second HARQ codebook is included in the second HARQ codebook set, and a transmission parameter corresponding to the second HARQ codebook set is less than or equal to the target threshold.

In a possible implementation, the transmission parameter corresponding to the second HARQ codebook set is:
the quantity of bits of the second HARQ codebook;
a sum of quantities of bits of all HARQ codebooks in the second HARQ codebook set;
a ratio of the quantity of bits of the second HARQ codebook to a sum of quantities of bits of all HARQ codebooks in the second HARQ codebook set;
a ratio of a time-frequency resource occupied by the second HARQ codebook to a time-frequency resource occupied by the second HARQ codebook set;
a ratio of a time-frequency resource occupied by the second HARQ codebook to a time-frequency resource occupied by an uplink channel that carries the second HARQ codebook set; or
a ratio of a time-frequency resource occupied by the second HARQ codebook set to a time-frequency resource occupied by an uplink channel that carries the second HARQ codebook set.

In a possible implementation,
the DCI corresponding to the M first channels includes at least one of the following:
a format of the DCI includes a first DCI format, an RNTI scrambling the DCI includes a first radio network temporary identifier RNTI, a search space in which the DCI is located includes a first search space, or a control resource set in which the DCI is located includes a first control resource set; and/or
the M first channels include at least one of the following:
downlink symbol configuration indexes corresponding to the first channels belong to a first downlink symbol configuration index set, indexes of start symbols on which the first channels are located belong to a first symbol index set, indexes of end symbols on which the first channels are located belong to the first symbol index set, quantities of symbols occupied by the first channels belong to a first quantity-of-symbols set, offsets corresponding to the first channels belong to a first offset set, or the offsets are offsets from the time domain resources on which the first channels are located to time domain resources on which the HARQ information corresponding to the first channels is located; and/or
an uplink channel corresponding to the M first channels that carries the HARQ information includes at least one of the following:
a resource of the uplink channel belongs to a first uplink channel resource set, a resource indication index of the uplink channel belongs to a first uplink channel resource indication index set, or a format of the uplink channel includes a first physical uplink control channel PUCCH format.

In this embodiment of this application, the M first channels correspond to a first service, for example, an eMBB service. That is, this application is applied only when the first service is a low-priority service. In this way, important HARQ information can be effectively protected from being reduced, and transmission efficiency of another high-priority service is protected by reducing HARQ information of the low-priority service.

In a possible implementation, the first HARQ codebook set further includes a third HARQ codebook, and the third HARQ codebook includes HARQ information corresponding to H second channels, where H is an integer.

In a possible implementation, the first HARQ codebook set is carried on a third channel.

In a possible implementation,
DCI corresponding to the H second channels includes at least one of the following:
a format of the DCI includes a second DCI format, an RNTI scrambling the DCI includes a second RNTI, a search space in which the DCI is located includes a second search space, or a control resource set in which the DCI is located includes a second control resource set; and/or
the H second channels include at least one of the following:
downlink symbol configuration indexes corresponding to the second channels belong to a second downlink symbol configuration index set, indexes of start symbols on which the second channels are located belong to a second symbol index set, indexes of end symbols on which the second channels are located belong to the second symbol index set, quantities of symbols occupied by the second channels belong to a second quantity-of-symbols set, offsets corresponding to the second channels belong to a second offset set, or the offsets are offsets from time domain resources on which the second channels are located to time domain resources on which the HARQ information corresponding to the second channels is located; and/or
an uplink channel corresponding to the H second channels that carries the HARQ information includes at least one of the following:
a resource of the uplink channel belongs to a second uplink channel resource set, a resource indication index of the uplink channel belongs to a second uplink channel resource indication index set, or a format of the uplink channel includes a second PUCCH format.

In a possible implementation,
DCI corresponding to the third channel includes at least one of the following:
a format of the DCI includes a third DCI format, an RNTI scrambling the DCI includes a third RNTI, a search space in which the DCI is located includes a third search space, or a control resource set in which the DCI is located includes a third control resource set; and/or
the third channel includes at least one of the following:
an uplink symbol configuration index corresponding to the third channel belongs to a first uplink symbol configuration index set, an index of a start symbol on which the third channel is located belongs to a third symbol index set, an index of an end symbol on which the third channel is located belongs to the third symbol index set, a quantity of symbols occupied by the third channel belongs to a third quantity-of-symbols set, the third channel is a configured grant channel, an offset corresponding to the third channel belongs to a third offset set, or the offset corresponding to the third channel is an offset from a time domain resource on which the DCI corresponding to the third channel is located to a time domain resource on which the third channel is located.

In this embodiment of this application, the third channel corresponds to a second service, for example, a URLLC service. That is, this application is applied only when there is the second service, which is a high-priority service. In this way, important information can be effectively protected, and transmission efficiency of another high-priority service is protected by reducing HARQ information of a low-priority service. The second channel corresponds to a second service, for example, a URLLC service. That is, this application is applied only when there is the second service, which is a high-priority service. In this way, important information can be effectively protected, and transmission efficiency of another high-priority service is protected by reducing HARQ information of a low-priority service.

In a possible implementation, the method further includes:
sending capability information, where the capability information is used to indicate that the terminal device is capable of sending the first HARQ codebook and a third HARQ codebook on one uplink channel; and/or
receiving configuration information, where the configuration information is used to configure the terminal device to send the first HARQ codebook and the third HARQ codebook on one uplink channel.

In a possible implementation, the method further includes:
sending capability information, where the capability information is used to indicate that the terminal device is capable of sending the first HARQ codebook or the second HARQ codebook on a third channel; and/or
receiving configuration information, where the configuration information is used to configure the terminal device to send the first HARQ codebook or the second HARQ codebook on the third channel.

In this embodiment of this application, capability reporting enables a network device to allow, based on different UE capabilities or different network device statuses, the terminal device to reduce or discard the first HARQ codebook.

According to a second aspect, a codebook receiving method is provided. The method is applied to a network device, and the method includes:
receiving a second hybrid automatic repeat request HARQ codebook set, where the second HARQ codebook set is generated based on a first HARQ codebook set, the first HARQ codebook set includes a first HARQ codebook, the first HARQ codebook includes HARQ information corresponding to M first channels, M is an integer, a transmission parameter corresponding to the first HARQ codebook set is greater than a target threshold, the second HARQ codebook set includes a second HARQ codebook or does not include the first HARQ codebook, the second HARQ codebook is generated based on the first HARQ codebook, a quantity of bits of the second HARQ codebook is less than a quantity of bits of the first HARQ codebook, and a transmission parameter corresponding to the second HARQ codebook set is less than or equal to the target threshold.

In a possible implementation, the second HARQ codebook is generated based on HARQ information corresponding to at least one of N first channel groups, the HARQ information corresponding to the at least one of the N first channel groups is determined based on HARQ information corresponding to a first channel included in the at least one of the N first channel groups, the N first channel groups are obtained after the M first channels are grouped, and each of the N first channel groups corresponds to a same first parameter or a same first parameter set.

In a possible implementation, the N first channel groups include a target first channel group; and if HARQ information corresponding to each first channel included in the target first channel group is an acknowledgement ACK, HARQ information corresponding to the target first channel group is an ACK; or
if HARQ information corresponding to any first channel included in the target first channel group is a negative acknowledgement NACK, HARQ information corresponding to the target first channel group is a NACK.

In a possible implementation, first parameters corresponding to the M first channels include at least one of the following:
downlink control information DCI for scheduling the first channels;
frequency domain resources occupied by the first channels;
time domain resources occupied by the first channels; or
information carried on the first channels.

In a possible implementation, the M first channels include a target first channel that carries HARQ information corresponding to a plurality of code block groups, a transport block corresponding to the target first channel includes the plurality of code block groups, and the second HARQ codebook is generated based on HARQ information corresponding to the target first channel that carries HARQ information corresponding to the transport block.

In a possible implementation, priorities of the HARQ information corresponding to the M first channels that is included in the first HARQ codebook are determined based on second parameters corresponding to the M first channels, and the second HARQ codebook is generated based on the first HARQ codebook and the priorities of the HARQ information corresponding to the M first channels that is in the first HARQ codebook.

In a possible implementation, the second HARQ codebook includes HARQ information corresponding to a first channel in the M first channels other than S first channels, and HARQ information corresponding to the S first channels is determined based on a sequence of the priorities of the HARQ information corresponding to the M first channels that is included in the first HARQ codebook, where M is greater than S.

In a possible implementation, priorities of HARQ information corresponding to the N first channel groups are determined based on the first parameters corresponding to the N first channel groups, and the second HARQ codebook is generated based on the priorities of the HARQ information corresponding to the N first channel groups and the HARQ information corresponding to the N first channel groups.

In a possible implementation, the second HARQ codebook includes HARQ information corresponding to a first channel group in the N channel groups other than Z first channel groups, and HARQ information corresponding to the Z first channel groups is determined based on a sequence of the priorities of the HARQ information corresponding to the N first channel groups that is included in the first HARQ codebook, where N is greater than Z.

In a possible implementation, the second parameters corresponding to the M first channels include at least one of the following:
offsets corresponding to the first channels, where the offsets are offsets from time domain resources on which the first channels are located to time domain resources on which the HARQ information corresponding to the first channels is located;
frequency domain resources occupied by the first channels;
downlink symbol configuration indexes corresponding to the first channels; or
time domain resources occupied by the first channels.

In a possible implementation, the transmission parameter corresponding to the first HARQ codebook set is:
the quantity of bits of the first HARQ codebook;

a sum of quantities of bits of all HARQ codebooks in the first HARQ codebook set;
a ratio of the quantity of bits of the first HARQ codebook to a sum of quantities of bits of all HARQ codebooks in the first HARQ codebook set;
a ratio of a time-frequency resource occupied by the first HARQ codebook to a time-frequency resource occupied by the first HARQ codebook set;
a ratio of a time-frequency resource occupied by the first HARQ codebook to a time-frequency resource occupied by an uplink channel that carries the first HARQ codebook set; or
a ratio of a time-frequency resource occupied by the first HARQ codebook set to a time-frequency resource occupied by an uplink channel that carries the first HARQ codebook set.

In a possible implementation, the transmission parameter corresponding to the second HARQ codebook set is:
the quantity of bits of the second HARQ codebook;
a sum of quantities of bits of all HARQ codebooks in the second HARQ codebook set;
a ratio of the quantity of bits of the second HARQ codebook to a sum of quantities of bits of all HARQ codebooks in the second HARQ codebook set;
a ratio of a time-frequency resource occupied by the second HARQ codebook to a time-frequency resource occupied by the second HARQ codebook set;
a ratio of a time-frequency resource occupied by the second HARQ codebook to a time-frequency resource occupied by an uplink channel that carries the second HARQ codebook set; or
a ratio of a time-frequency resource occupied by the second HARQ codebook set to a time-frequency resource occupied by an uplink channel that carries the second HARQ codebook set.

In a possible implementation,
the DCI corresponding to the M first channels includes at least one of the following:
a format of the DCI includes a first DCI format, an RNTI scrambling the DCI includes a first RNTI, a search space in which the DCI is located includes a first search space, or a control resource set in which the DCI is located includes a first control resource set; and/or
the M first channels include at least one of the following:
downlink symbol configuration indexes corresponding to the first channels belong to a first downlink symbol configuration index set, indexes of start symbols on which the first channels are located belong to a first symbol index set, indexes of end symbols on which the first channels are located belong to the first symbol index set, quantities of symbols occupied by the first channels belong to a first quantity-of-symbols set, offsets corresponding to the first channels belong to a first offset set, or the offsets are offsets from the time domain resources on which the first channels are located to time domain resources on which the HARQ information corresponding to the first channels is located; and/or
an uplink channel corresponding to the M first channels that carries the HARQ information includes at least one of the following:
a resource of the uplink channel belongs to a first uplink channel resource set, a resource indication index of the uplink channel belongs to a first uplink channel resource indication index set, or a format of the uplink channel includes a first physical uplink control channel PUCCH format.

In a possible implementation, the second HARQ codebook set further includes a third HARQ codebook, and the third HARQ codebook includes HARQ information corresponding to H second channels, where H is an integer.

In a possible implementation, the second HARQ codebook set is carried on a third channel.

In a possible implementation,
DCI corresponding to the H second channels includes at least one of the following:
a format of the DCI includes a second DCI format, an RNTI scrambling the DCI includes a second RNTI, a search space in which the DCI is located includes a second search space, or a control resource set in which the DCI is located includes a second control resource set; and/or
the H second channels include at least one of the following:
downlink symbol configuration indexes corresponding to the second channels belong to a second downlink symbol configuration index set, indexes of start symbols on which the second channels are located belong to a second symbol index set, indexes of end symbols on which the second channels are located belong to the second symbol index set, quantities of symbols occupied by the second channels belong to a second quantity-of-symbols set, offsets corresponding to the second channels belong to a second offset set, or the offsets are offset from time domain resources on which the second channels are located to time domain resources on which the HARQ information corresponding to the second channels is located; and/or
an uplink channel corresponding to the H second channels that carries the HARQ information includes at least one of the following:
a resource of the uplink channel belongs to a second uplink channel resource set, a resource indication index of the uplink channel belongs to a second uplink channel resource indication index set, or a format of the uplink channel includes a second PUCCH format.

In a possible implementation,
DCI corresponding to the third channel includes at least one of the following:
a format of the DCI includes a third DCI format, an RNTI scrambling the DCI includes a third RNTI, a search space in which the DCI is located includes a third search space, or a control resource set in which the DCI is located includes a third control resource set; and/or
the third channel includes at least one of the following:
an uplink symbol configuration index corresponding to the third channel belongs to a first uplink symbol configuration index set, an index of a start symbol on which the third channel is located belongs to a third symbol index set, an index of an end symbol on which the third channel is located belongs to the third symbol index set, a quantity of symbols occupied by the third channel belongs to a third quantity-of-symbols set, the third channel is a configured grant channel, an offset corresponding to the third channel belongs to a third offset set, or the offset is an offset from a time domain resource on which the DCI corresponding to the third channel is located to a time domain resource on which the third channel is located.

In a possible implementation, the method further includes:
receiving capability information, where the capability information is used to indicate that a terminal device is capable of sending the first HARQ codebook and a third HARQ codebook on one uplink channel; and/or sending configuration information, where the configuration information is used to configure the terminal device to send the first HARQ codebook and the third HARQ codebook on one uplink channel.

In a possible implementation, the method further includes:

receiving capability information, where the capability information is used to indicate that a terminal device is capable of sending the first HARQ codebook or the second HARQ codebook on a third channel; and/or sending configuration information, where the configuration information is used to configure the terminal device to send the first HARQ codebook or the second HARQ codebook on the third channel.

According to a third aspect, a codebook processing apparatus is provided. The apparatus is used in a terminal device, and the apparatus includes:

a processing module, configured to obtain a transmission parameter corresponding to a first hybrid automatic repeat request HARQ codebook set, where the first HARQ codebook set includes a first HARQ codebook, the first HARQ codebook includes HARQ information corresponding to M first channels, M is an integer, and the transmission parameter corresponding to the first HARQ codebook set is greater than a target threshold, where the processing module is configured to: generate a second HARQ codebook based on the first HARQ codebook, where a quantity of bits of the second HARQ codebook is less than a quantity of bits of the first HARQ codebook; or discard the first HARQ codebook.

In a possible implementation, the processing module is further configured to:

determine, based on HARQ information corresponding to a first channel included in each of N first channel groups, HARQ information corresponding to each first channel group, where the N first channel groups are obtained by grouping the M first channels based on first parameters or first parameter sets; and generate the second HARQ codebook based on HARQ information corresponding to at least one of the N first channel groups.

In a possible implementation, the N first channel groups include a target first channel group; and if HARQ information corresponding to each first channel included in the target first channel group is an acknowledgement ACK, HARQ information corresponding to the target first channel group is an ACK; or if HARQ information corresponding to any first channel included in the target first channel group is a negative acknowledgement NACK, HARQ information corresponding to the target first channel group is a NACK.

In a possible implementation, the first parameters corresponding to the M first channels include at least one of the following:

downlink control information DCI for scheduling the first channels;

frequency domain resources occupied by the first channels;

time domain resources occupied by the first channels; or information carried on the first channels.

In a possible implementation, the processing module is further configured to: the M first channels include a target first channel that carries HARQ information corresponding to a plurality of code block groups, and a transport block corresponding to the target first channel includes the plurality of code block groups; and generate the second HARQ codebook based on HARQ information corresponding to the target first channel that carries HARQ information corresponding to the transport block.

In a possible implementation, the processing module is further configured to:

determine, based on second parameters corresponding to the M first channels, priorities of the HARQ information corresponding to the M first channels that is included in the first HARQ codebook; and generate the second HARQ codebook based on the priorities of the HARQ information corresponding to the M first channels.

In a possible implementation, the processing module is further configured to:

discard, in ascending order of the priorities of the HARQ information corresponding to the M first channels that is included in the first HARQ codebook, HARQ information corresponding to S first channels in the M first channels, and generate the second HARQ codebook, where the second HARQ codebook includes HARQ information corresponding to a first channel in the M first channels other than the S first channels; or generate the second HARQ codebook in descending order of the priorities of the HARQ information corresponding to the M first channels that is included in the first HARQ codebook, where HARQ information corresponding to S first channels that is in the first HARQ codebook is reserved in the second HARQ codebook, where M is greater than S.

In a possible implementation, the processing module is further configured to:

determine, based on first parameters corresponding to the N first channel groups, priorities of the HARQ information corresponding to the N first channel groups; and generate the second HARQ codebook based on the priorities of the HARQ information corresponding to the N first channel groups.

In a possible implementation, the processing module is further configured to:

discard, in ascending order of the priorities of the HARQ information corresponding to the N first channel groups that is included in the first HARQ codebook, HARQ information corresponding to Z first channel groups in the N first channel groups, and generate the second HARQ codebook, where the second HARQ codebook includes HARQ information corresponding to a first channel group in the N channel groups other than the Z first channel groups; or generate the second HARQ codebook in descending order of the priorities of the HARQ information corresponding to the N first channel groups that is included in the first HARQ codebook, where HARQ information corresponding to Z first channel groups that is in the first HARQ codebook is reserved in the second HARQ codebook, where N is greater than Z.

In a possible implementation, the second parameters corresponding to the M first channels include at least one of the following:

offsets corresponding to the first channels, where the offsets are offsets from time domain resources on which the first channels are located to time domain resources on which the HARQ information corresponding to the first channels is located;
frequency domain resources occupied by the first channels;
downlink symbol configuration indexes corresponding to the first channels; or
time domain resources occupied by the first channels.

In a possible implementation, the transmission parameter corresponding to the first HARQ codebook set is:
the quantity of bits of the first HARQ codebook;
a sum of quantities of bits of all HARQ codebooks in the first HARQ codebook set;
a ratio of the quantity of bits of the first HARQ codebook to a sum of quantities of bits of all HARQ codebooks in the first HARQ codebook set;
a ratio of a time-frequency resource occupied by the first HARQ codebook to a time-frequency resource occupied by the first HARQ codebook set;
a ratio of a time-frequency resource occupied by the first HARQ codebook to a time-frequency resource occupied by an uplink channel that carries the first HARQ codebook set; or
a ratio of a time-frequency resource occupied by the first HARQ codebook set to a time-frequency resource occupied by an uplink channel that carries the first HARQ codebook set.

In a possible implementation, the second HARQ codebook is included in a second HARQ codebook set, and a transmission parameter corresponding to the second HARQ codebook set is less than or equal to the target threshold.

In a possible implementation, the transmission parameter corresponding to the second HARQ codebook set is:
the quantity of bits of the second HARQ codebook;
a sum of quantities of bits of all HARQ codebooks in the second HARQ codebook set;
a ratio of the quantity of bits of the second HARQ codebook to a sum of quantities of bits of all HARQ codebooks in the second HARQ codebook set;
a ratio of a time-frequency resource occupied by the second HARQ codebook to a time-frequency resource occupied by the second HARQ codebook set;
a ratio of a time-frequency resource occupied by the second HARQ codebook to a time-frequency resource occupied by an uplink channel that carries the second HARQ codebook set; or
a ratio of a time-frequency resource occupied by the second HARQ codebook set to a time-frequency resource occupied by an uplink channel that carries the second HARQ codebook set.

In a possible implementation,
the DCI corresponding to the M first channels includes at least one of the following:
a format of the DCI includes a first DCI format, an RNTI scrambling the DCI includes a first RNTI, a search space in which the DCI is located includes a first search space, or a control resource set in which the DCI is located includes a first control resource set; and/or
the M first channels include at least one of the following:
downlink symbol configuration indexes corresponding to the first channels belong to a first downlink symbol configuration index set, indexes of start symbols on which the first channels are located belong to a first symbol index set, indexes of end symbols on which the first channels are located belong to the first symbol index set, quantities of symbols occupied by the first channels belong to a first quantity-of-symbols set, offsets corresponding to the first channels belong to a first offset set, or the offsets are offsets from the time domain resources on which the first channels are located to time domain resources on which the HARQ information corresponding to the first channels is located; and/or
an uplink channel corresponding to the M first channels that carries the HARQ information includes at least one of the following:
a resource of the uplink channel belongs to a first uplink channel resource set, a resource indication index of the uplink channel belongs to a first uplink channel resource indication index set, or a format of the uplink channel includes a first physical uplink control channel PUCCH format.

In a possible implementation, the first HARQ codebook set further includes a third HARQ codebook, and the third HARQ codebook includes HARQ information corresponding to H second channels, where H is an integer.

In a possible implementation, the first HARQ codebook set is carried on a third channel.

In a possible implementation,
DCI corresponding to the H second channels includes at least one of the following:
a format of the DCI includes a second DCI format, an RNTI scrambling the DCI includes a second RNTI, a search space in which the DCI is located includes a second search space, or a control resource set in which the DCI is located includes a second control resource set; and/or
the H second channels include at least one of the following:
downlink symbol configuration indexes corresponding to the second channels belong to a second downlink symbol configuration index set, indexes of start symbols on which the second channels are located belong to a second symbol index set, indexes of end symbols on which the second channels are located belong to the second symbol index set, quantities of symbols occupied by the second channels belong to a second quantity-of-symbols set, offsets corresponding to the second channels belong to a second offset set, or the offsets are offsets from time domain resources on which the second channels are located to time domain resources on which the HARQ information corresponding to the second channels is located; and/or
an uplink channel corresponding to the H second channels that carries the HARQ information includes at least one of the following:
a resource of the uplink channel belongs to a second uplink channel resource set, a resource indication index of the uplink channel belongs to a second uplink channel resource indication index set, or a format of the uplink channel includes a second PUCCH format.

In a possible implementation,
DCI corresponding to the third channel includes at least one of the following:
a format of the DCI includes a third DCI format, an RNTI scrambling the DCI includes a third RNTI, a search space in which the DCI is located includes a third search space, or a control resource set in which the DCI is located includes a third control resource set; and/or
the third channel includes at least one of the following:
an uplink symbol configuration index corresponding to the third channel belongs to a first uplink symbol configuration index set, an index of a start symbol on which the third channel is located belongs to a third symbol index set, an index of an end symbol on which the third channel is located belongs to the third symbol index set, a quantity of symbols occupied by the third channel belongs to a third quantity-of-symbols set, the third channel is a configured grant channel, an offset corresponding to the third channel belongs to a third offset set, or the offset corresponding to the third channel is an offset from a time domain resource on which the DCI corresponding to the third channel is located to a time domain resource on which the third channel is located.

In a possible implementation, the apparatus further includes a sending module and a receiving module, and the sending module and the receiving module are separately connected to the processing module; and
the sending module is configured to send capability information, where the capability information is used to indicate that the terminal device is capable of sending the first HARQ codebook and a third HARQ codebook on one uplink channel; and/or
the receiving module is configured to receive configuration information, where the configuration information is used to configure the terminal device to send the first HARQ codebook and the third HARQ codebook on one uplink channel.

In a possible implementation, the apparatus further includes a sending module and a receiving module, and the sending module and the receiving module are separately connected to the processing module;
the sending module is configured to send capability information, where the capability information is used to indicate that the terminal device is capable of sending the first HARQ codebook or the second HARQ codebook on a third channel; and/or
the receiving module is configured to receive configuration information, where the configuration information is used to configure the terminal device to send the first HARQ codebook or the second HARQ codebook on the third channel.

According to a fourth aspect, a codebook receiving apparatus is provided. The apparatus is used in a network device, and the apparatus includes:
a receiving module, configured to receive a second hybrid automatic repeat request HARQ codebook set, where the second HARQ codebook set is generated based on a first HARQ codebook set, the first HARQ codebook set includes a first HARQ codebook, the first HARQ codebook includes HARQ information corresponding to M first channels, M is an integer, a transmission parameter corresponding to the first HARQ codebook set is greater than a target threshold, the second HARQ codebook set includes a second HARQ codebook or does not include the first HARQ codebook, the second HARQ codebook is generated based on the first HARQ codebook, a quantity of bits of the second HARQ codebook is less than a quantity of bits of the first HARQ codebook, and a transmission parameter corresponding to the second HARQ codebook set is less than or equal to the target threshold.

In a possible implementation, the second HARQ codebook is generated based on HARQ information corresponding to at least one of N first channel groups, the HARQ information corresponding to the at least one of the N first channel groups is determined based on HARQ information corresponding to a first channel included in the at least one of the N first channel groups, the N first channel groups are obtained after the M first channels are grouped, and each of the N first channel groups corresponds to a same first parameter or a same first parameter set.

In a possible implementation, the N first channel groups include a target first channel group; and if HARQ information corresponding to each first channel included in the target first channel group is an acknowledgement ACK, HARQ information corresponding to the target first channel group is an ACK; or
if HARQ information corresponding to any first channel included in the target first channel group is a negative acknowledgement NACK, HARQ information corresponding to the target first channel group is a NACK.

In a possible implementation, first parameters corresponding to the M first channels include at least one of the following:
downlink control information DCI for scheduling the first channels;
frequency domain resources occupied by the first channels;
time domain resources occupied by the first channels; or
information carried on the first channels.

In a possible implementation, the M first channels include a target first channel that carries HARQ information corresponding to a plurality of code block groups, a transport block corresponding to the target first channel includes the plurality of code block groups, and the second HARQ codebook is generated based on HARQ information corresponding to the target first channel that carries HARQ information corresponding to the transport block.

In a possible implementation, priorities of the HARQ information corresponding to the M first channels that is included in the first HARQ codebook are determined based on second parameters corresponding to the M first channels, and the second HARQ codebook is generated based on the first HARQ codebook and the priorities of the HARQ information corresponding to the M first channels that is in the first HARQ codebook.

In a possible implementation, the second HARQ codebook includes HARQ information corresponding to a first channel in the M first channels other than S first channels, and HARQ information corresponding to the S first channels is determined based on a sequence of the priorities of the HARQ information corresponding to the M first channels that is included in the first HARQ codebook, where M is greater than S.

In a possible implementation, priorities of HARQ information corresponding to the N first channel groups are determined based on the first parameters corresponding to the N first channel groups, and the second HARQ codebook is generated based on the priorities of the HARQ information corresponding to the N first channel groups and the HARQ information corresponding to the N first channel groups.

In a possible implementation, the second HARQ codebook includes HARQ information corresponding to a first channel group in the N channel groups other than Z first channel groups, and HARQ information corresponding to the Z first channel groups is determined based on a sequence of the priorities of the HARQ information corresponding to the N first channel groups that is included in the first HARQ codebook, where N is greater than Z.

In a possible implementation, the second parameters corresponding to the M first channels include at least one of the following:
offsets corresponding to the first channels, where the offsets are offsets from time domain resources on which the first channels are located to time domain resources on which the HARQ information corresponding to the first channels is located;
frequency domain resources occupied by the first channels;
downlink symbol configuration indexes corresponding to the first channels; or
time domain resources occupied by the first channels.

In a possible implementation, the transmission parameter corresponding to the first HARQ codebook set is:
the quantity of bits of the first HARQ codebook;
a sum of quantities of bits of all HARQ codebooks in the first HARQ codebook set;
a ratio of the quantity of bits of the first HARQ codebook to a sum of quantities of bits of all HARQ codebooks in the first HARQ codebook set;
a ratio of a time-frequency resource occupied by the first HARQ codebook to a time-frequency resource occupied by the first HARQ codebook set;
a ratio of a time-frequency resource occupied by the first HARQ codebook to a time-frequency resource occupied by an uplink channel that carries the first HARQ codebook set; or
a ratio of a time-frequency resource occupied by the first HARQ codebook set to a time-frequency resource occupied by an uplink channel that carries the first HARQ codebook set.

In a possible implementation, the transmission parameter corresponding to the second HARQ codebook set is:
the quantity of bits of the second HARQ codebook;
a sum of quantities of bits of all HARQ codebooks in the second HARQ codebook set;
a ratio of the quantity of bits of the second HARQ codebook to a sum of quantities of bits of all HARQ codebooks in the second HARQ codebook set;
a ratio of a time-frequency resource occupied by the second HARQ codebook to a time-frequency resource occupied by the second HARQ codebook set;
a ratio of a time-frequency resource occupied by the second HARQ codebook to a time-frequency resource occupied by an uplink channel that carries the second HARQ codebook set; or
a ratio of a time-frequency resource occupied by the second HARQ codebook set to a time-frequency resource occupied by an uplink channel that carries the second HARQ codebook set.

In a possible implementation,
the DCI corresponding to the M first channels includes at least one of the following:
a format of the DCI includes a first DCI format, an RNTI scrambling the DCI includes a RNTI, a search space in which the DCI is located includes a first search space, or a control resource set in which the DCI is located includes a first control resource set; and/or
the M first channels include at least one of the following:
downlink symbol configuration indexes corresponding to the first channels belong to a first downlink symbol configuration index set, indexes of start symbols on which the first channels are located belong to a first symbol index set, indexes of end symbols on which the first channels are located belong to the first symbol index set, quantities of symbols occupied by the first channels belong to a first quantity-of-symbols set, offsets corresponding to the first channels belong to a first offset set, or the offsets are offsets from the time domain resources on which the first channels are located to time domain resources on which the HARQ information corresponding to the first channels is located; and/or
an uplink channel corresponding to the M first channels that carries the HARQ information includes at least one of the following:
a resource of the uplink channel belongs to a first uplink channel resource set, a resource indication index of the uplink channel belongs to a first uplink channel resource indication index set, or a format of the uplink channel includes a first physical uplink control channel PUCCH format.

In a possible implementation, the second HARQ codebook set further includes a third HARQ codebook, and the third HARQ codebook includes HARQ information corresponding to H second channels, where H is an integer.

In a possible implementation, the second HARQ codebook set is carried on a third channel.

In a possible implementation,
DCI corresponding to the H second channels includes at least one of the following:
a format of the DCI includes a second DCI format, an RNTI scrambling the DCI includes a second RNTI, a search space in which the DCI is located includes a second search space, or a control resource set in which the DCI is located includes a second control resource set; and/or
the H second channels include at least one of the following:
downlink symbol configuration indexes corresponding to the second channels belong to a second downlink symbol configuration index set, indexes of start symbols on which the second channels are located belong to a second symbol index set, indexes of end symbols on which the second channels are located belong to the second symbol index set, quantities of symbols occupied by the second channels belong to a second quantity-of-symbols set, offsets corresponding to the second channels belong to a second offset set, or the offsets are offsets from time domain resources on which the second channels are located to time domain resources on which the HARQ information corresponding to the second channels is located; and/or
an uplink channel corresponding to the H second channels that carries the HARQ information includes at least one of the following:
a resource of the uplink channel belongs to a second uplink channel resource set, a resource indication index of the uplink channel belongs to a second uplink channel resource indication index set, or a format of the uplink channel includes a second PUCCH format.

In a possible implementation,
DCI corresponding to the third channel includes at least one of the following:
a format of the DCI includes a third DCI format, an RNTI scrambling the DCI includes a third RNTI, a search space in which the DCI is located includes a third search space, or a control resource set in which the DCI is located includes a third control resource set; and/or
the third channel includes at least one of the following:
an uplink symbol configuration index corresponding to the third channel belongs to a first uplink symbol configuration index set, an index of a start symbol on which the third channel is located belongs to a third symbol index set, an index of an end symbol on which the third channel is located belongs to the third symbol index set, a quantity of symbols occupied by the third channel belongs to a third quantity-of-symbols set, the third channel is a configured grant channel, an offset corresponding to the third channel belongs to a third offset set, or the offset is an offset from a time domain resource on which the DCI corresponding to the third channel is located to a time domain resource on which the third channel is located.

In a possible implementation, the apparatus further includes a sending module, and the sending module and the receiving module are separately connected to a processing module; and the receiving module is configured to receive capability information, where the capability information is used to indicate that a terminal device is capable of sending the first HARQ codebook and a third HARQ codebook on one uplink channel; and/or the sending module is configured to send configuration information, where the configuration information is used to configure the terminal device to send the first HARQ codebook and the third HARQ codebook on one uplink channel.

In a possible implementation, the apparatus further includes a sending module, and the sending module and the receiving module are separately connected to a processing module; and the receiving module is configured to receive capability information, where the capability information is used to indicate that a terminal device is capable of sending the first HARQ codebook or the second HARQ codebook on a third channel; and/or the sending module is configured to send configuration information, where the configuration information is used to configure the terminal device to send the first HARQ codebook or the second HARQ codebook on the third channel.

According to a fifth aspect, a codebook processing apparatus is provided, and the codebook processing apparatus has a function of implementing behavior of the terminal device in the foregoing method designs. The function may be implemented by hardware, or may be implemented by hardware executing corresponding software. The hardware or software includes one or more modules corresponding to the function. The module may be software and/or hardware.

In a possible design, a structure of the codebook processing apparatus includes a transceiver and a processor. The transceiver is configured to support communication between the terminal device and a network device, and send information or an instruction in the foregoing methods to the network device, or receive information or an instruction in the foregoing methods that is sent by the network device. The processor is configured to: obtain a transmission parameter corresponding to a first hybrid automatic repeat request HARQ codebook set, where the first HARQ codebook set includes a first HARQ codebook, the first HARQ codebook includes HARQ information corresponding to M first channels, M is an integer, and the transmission parameter corresponding to the first HARQ codebook set is greater than a target threshold; and generate a second HARQ codebook based on the first HARQ codebook, where a quantity of bits of the second HARQ codebook is less than a quantity of bits of the first HARQ codebook, or delete the first HARQ codebook from the first HARQ codebook set.

According to a sixth aspect, an embodiment of this application provides a codebook receiving apparatus, and the codebook receiving apparatus has a function of implementing behavior of the network device in the foregoing method designs. The function may be implemented by hardware, or may be implemented by hardware executing corresponding software. The hardware or software includes one or more modules corresponding to the function.

In a possible design, a structure of the codebook receiving apparatus includes a processor and a transceiver. The processor is configured to support the network device in performing a corresponding function in the foregoing methods. The transceiver is configured to: support communication between the network device and a terminal device, send information or an instruction in the foregoing methods to the terminal device, or receive information or an instruction in the foregoing methods that is sent by the terminal device. The network device may further include a memory. The memory is configured to be coupled to the processor, and stores necessary program instructions and data of the network device.

According to a seventh aspect, an embodiment of this application further provides a computer-readable storage medium, including computer software instructions. When the computer software instructions are run in an information indication apparatus, the information indication apparatus is enabled to perform the methods according to the first aspect and the second aspect.

According to an eighth aspect, an embodiment of this application further provides a computer program product including instructions. When the computer program product runs in an information indication apparatus, the information indication apparatus is enabled to perform the methods according to the first aspect and the second aspect.

According to a ninth aspect, an embodiment of this application provides a chip system. The chip system includes a processor, and may further include a memory, to implement a function of the network device or the terminal device in the foregoing methods. The chip system may include a chip, or may include a chip and another discrete component.

According to a tenth aspect, an embodiment of this application further provides a communication system. The communication system includes the codebook processing apparatus described in the third aspect or an information indication apparatus that supports a terminal device in implementing the method described in the first aspect, and includes the codebook receiving apparatus described in the fourth aspect or an information indication apparatus that supports a network device in implementing the method described in the second aspect.

Alternatively, the communication system includes the codebook processing apparatus described in the fifth aspect or an information indication apparatus that supports a terminal device in implementing the method described in the first aspect, and includes the codebook receiving apparatus described in the sixth aspect or an information indication apparatus that supports a network device in implementing the method described in the second aspect.

In addition, for technical effects brought by design manners in any one of the foregoing aspects, refer to the technical effects brought by different design manners in the first aspect and the second aspect. Details are not described herein again.

In the embodiments of this application, names of the terminal device, the network device, and the information indication apparatus constitute no limitation on the devices. In an actual implementation, the devices may have other names, provided that functions of the devices are similar to those in the embodiments of this application, and fall within the scope of the claims of this application and their equivalent technologies.

DESCRIPTION OF EMBODIMENTS

Figure 1:
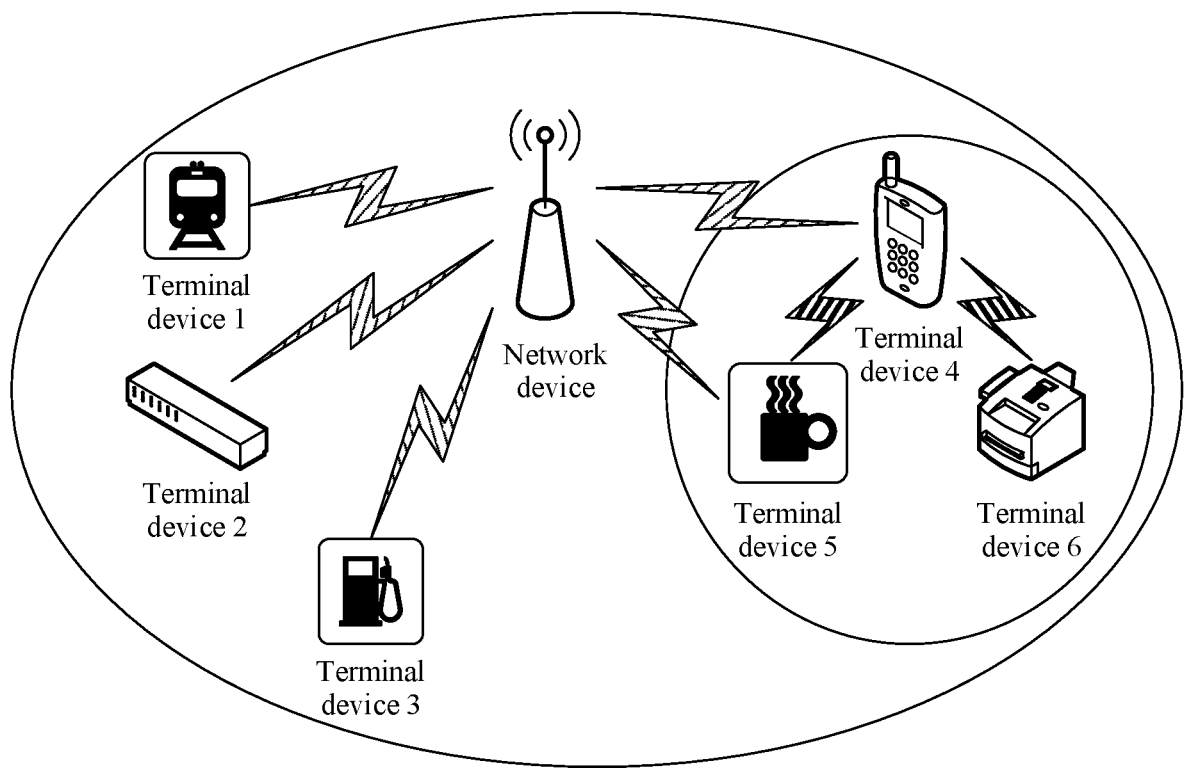
FIG. 1 is an architectural diagram of a communication network system according to an embodiment of this application.

Embodiments of this application provide a codebook processing method, and the method may be applied to a terminal device and a network device in a communication network. The communication network may be a communication network that supports a 4th generation (4G) access technology, for example, a long term evolution (LTE) access technology. Alternatively, the communication network may be a communication network that supports a 5G access technology, for example, a new radio (NR) access technology. Alternatively, the communication network may be a communication network that supports a third generation (3G) access technology, for example, a universal mobile telecommunications system (UMTS) access technology or a 3rd generation partnership project (3GPP) access technology. Alternatively, the communication network may be a communication network that supports a 2nd generation (2G) access technology, for example, a global system for mobile communications (GSM) access technology. Alternatively, the communication network may be a communication network that supports a plurality of wireless technologies, and for example, may be a communication network that supports an LTE technology and an NR technology. In addition, the communication network may be further applied to future-oriented communication technologies. FIG. 1 is an architectural diagram of a communication network according to an embodiment of this application. As shown in FIG. 1, the communication network includes a network device and a terminal device 1 to a terminal device 6. The network device may be an entity that is on a network side in the communication system and that is configured to transmit or receive a signal. For example, the network device may be a device configured to communicate with a mobile device, and may be: an access point (AP) in a wireless local area network (WLAN), a base transceiver station (BTS) in GSM or code division multiple access (CDMA), a NodeB (NB) in wideband code division multiple access (WCDMA), an evolved NodeB (eNB or eNodeB) in LTE, a relay station, an access point, a vehicle-mounted device, a wearable device, a network device in a 5G network, a network device in a future evolved public land mobile network (PLMN), a new generation NodeB (gNodeB) in an NR system, or the like. The terminal device may be an entity that is on a user side in the communication system and that is configured to receive or transmit a signal, for example, gUE. The terminal device may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device may be a station (ST) in a WLAN, or may be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, a wearable device, a terminal device in a next-generation communication system, for example, a 5G network, a terminal device in a future evolved PLMN, a terminal device in an NR communication system, or the like. As an example instead of a limitation, in the embodiments of this application, the terminal device may alternatively be a wearable device. The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that is directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as a smartphone, for example, various smart bands or smart accessories for monitoring physical signs. In addition, in the embodiments of this application, the network device may serve a cell, and the terminal device communicates with the network device on a transmission resource (for example, a frequency domain resource or a spectrum resource) used in the cell. The cell may be a cell corresponding to the network device, and the cell may belong to a macro base station, or may belong to a base station corresponding to a small cell. The small cell may include a metro cell, a micro cell, a pico cell, a femto cell, and the like. These small cells have characteristics of small coverage and low transmit power, and are applicable to providing a high-speed data transmission service.

In addition, the terminal device 4 to the terminal device 6 may alternatively form a communication system. In the communication system, the network device may send downlink data to the terminal device 1, the terminal device 2, and the terminal device 4 on a PDSCH, and further, the terminal device 4 may forward the downlink data to the terminal device 5 and the terminal device 6. In this embodiment of this application, an example in which the network device and the terminal device 1 to the terminal device 6 form a communication system is used for description. Another case is similar to the example. In the communication network, a base station may send the downlink data to the terminal device 1 to the terminal device 6 on the PDSCH. After receiving the downlink data, the terminal device 1 to the terminal device 6 each may decode the downlink data, and send an ACK message or a NACK message to the base station on an uplink channel (for example, a PUCCH and a PUSCH) based on a decoding result. When receiving the NACK message, the base station may perform retransmission to ensure reliable transmission of the downlink data. The foregoing data transmission mechanism is also referred to as a HARQ mechanism. To improve HARQ feedback flexibility, a semi-static HARQ codebook feedback mechanism or a dynamic HARQ codebook feedback mechanism is introduced in 5G NR. In the semi-static HARQ codebook feedback mechanism, one downlink receiving occasion (namely, one occasion on which a PDSCH can be transmitted) corresponds to at least one bit in a semi-static HARQ codebook (for example, a bit location 1 indicates the ACK message, and a bit location 0 indicates the NACK message). In the dynamic HARQ codebook feedback mechanism, the terminal device may map HARQ information corresponding to a PDSCH indicated by received downlink control information (DCI) to a bit in a dynamic HARQ codebook. One piece of DCI (one piece of DCI may correspond to one or more PDSCHs) corresponds to at least one bit in the dynamic HARQ codebook, or may correspond to a plurality of bits. In the communication network, the ITU defines three major types of services for 5G and a future mobile communication system: an eMBB service, a URLLC service, and an mMTC service. The eMBB service is mainly characterized by a large amount of transmitted data and a high transmission rate. Typical eMBB services include an ultra high-definition video service, an augmented reality (AR) service, a virtual reality (VR) service, and the like. The URLLC service is mainly characterized by ultra-high reliability, a low latency, a relatively small amount of transmitted data, and burstiness. Typical URLLC services include tactile interactive services such as a wireless control service in an industrial manufacturing or production process, a motion control service of a self-driving car and an unmanned plane, a remote repair service, and a remote surgery service. The mMTC service is mainly characterized by a large quantity of network-connected devices, a relatively small amount of transmitted data, insensitivity of data to a transmission latency, and requirements for low costs and a very long standby time period that a terminal device needs to meet. Typical mMTC services include a smart grid power distribution automation service, a smart city service, and the like.

Based on a conventional technology, when a service on a PUCCH or a PUSCH has a relatively large quantity of pieces of HARQ information, transmission efficiency of another service that is more important and that is on the PUCCH or the PUSCH is affected. For example, when an eMBB service on the PUCCH or the PUSCH has a relatively large quantity of pieces of HARQ information, transmission efficiency of a URLLC service that has a relatively high latency requirement is affected. Therefore, how to improve transmission efficiency of another service that is more important and that is on the PUCCH or the PUSCH is an urgent problem to be resolved.

In a 5G NR communication system, a terminal device may implicitly distinguish between different services based on a PDSCH and HARQ information corresponding to the PDSCH. There may be various manners in which the terminal device implicitly distinguishes between different services based on a PDSCH and HARQ information corresponding to the PDSCH. The embodiments of this application provide several feasible manners, and the manners are specifically as follows:

Manner 1: Services are distinguished based on a DCI format corresponding to DCI, that is, different services are distinguished by using different DCI formats. The DCI formats may include a DCI format 1_0, a DCI format 1_1, and a DCI format 1_2, or may be another format. This is not limited in this application. A quantity of bits that corresponds to the DCI format 1_2 is less than a quantity of bits that corresponds to the DCI format 1_0. For example, a difference between the quantity of bits that corresponds to the DCI format 1_2 and the quantity of bits that corresponds to the DCI format 1_0 is less than or equal to any bit value ranging from 10 bits to 16 bits. Further, for example, the DCI format 1_2 corresponds to the URLLC service, and the DCI format 1_0 and/or the DCI format 1_1 correspond/corresponds to the eMBB service. It may be understood that, in this case, HARQ information corresponding to PDSCHs/a PDSCH indicated by the DCI format 1_0 and/or the DCI format 1_1 belongs to a first HARQ codebook, and HARQ information corresponding to a PDSCH indicated by the DCI format 1_2 belongs to a third HARQ codebook.

Manner 2: Services are distinguished based on a radio network identifier (RNTI) for scrambling DCI. A network device may scramble a cyclic redundancy check (CRC) code of the DCI by using the RNTI. Correspondingly, the terminal device may distinguish between different DCI by using RNTIs. That is, different services are distinguished by using different RNTIs. The RNTIs may include a system information radio network identifier (SI-RNTI), a random access radio network identifier (RA-RNTI), a temporary cell radio network identifier (TC-RNTI), a paging radio network identifier (P-RNTI), a cell radio network identifier (C-RNTI), a configured scheduling radio network identifier (CS-RNTI), and a modulation and coding scheme cell radio network identifier (MCS-C-RNTI), or may be another type of RNTI. This is not limited in this application. Further, for example, the MCS-C-RNTI and/or the CS-RNTI correspond/corresponds to the URLLC service, and the C-RNTI corresponds to the eMBB service. It may be understood that, in this case, HARQ information corresponding to a PDSCH indicated by DCI scrambled by using the C-RNTI belongs to a first HARQ codebook, and HARQ information corresponding to PDSCHs/a PDSCH indicated by DCI scrambled by using the MCS-C-RNTI and/or the CS-RNTI belongs to a third HARQ codebook.

Manner 3: Services are distinguished based on a search space in which DCI is located, that is, different services are distinguished by using different search spaces. One group of candidate PDSCHs that can be monitored by one terminal device is defined as a downlink information search space set. Types of the search space set may include a common search space set and a UE-specific search space set. The common search space set may include a Type0 common search space set, a Type0A common search space set, a Type1 common search space set, a Type2 common search space set, and a Type3 common search space set. Further, for example, the UE-specific search space set may correspond to the URLLC service, and the common search space set may correspond to the eMBB service. It may be understood that, in this case, HARQ information corresponding to a PDSCH indicated by DCI detected in the common search space set belongs to a first HARQ codebook, and HARQ information corresponding to a PDSCH indicated by DCI detected in the UE-specific search space set belongs to a third HARQ codebook.

Manner 4: Services are distinguished based on a control resource set in which DCI is located, that is, different services are distinguished by using different control resource sets. One control resource set (CORESET) includes physical resources of a plurality of resource element groups (REG). A resource of one CORESET may occupy one, two, or three symbols in time domain, and may occupy one or more resource blocks in frequency domain. The resource of the CORESET is configured by using higher layer signaling. One CORESET may include a plurality of search spaces, and one search space corresponds to at least one CORESET. Further, for example, a first CORESET set corresponds to the eMBB service, and a second CORESET set corresponds to the URLLC service. It may be understood that, in this case, HARQ information corresponding to a PDSCH indicated by DCI detected in the first CORESET set belongs to a first HARQ codebook, and HARQ information corresponding to a PDSCH indicated by DCI detected in the second CORESET set belongs to a third HARQ codebook. The higher layer signaling may be signaling sent by a higher-layer protocol layer. The higher-layer protocol layer is at least one of all protocol layers above a physical layer. The higher-layer protocol layer may be specifically at least one of the following protocol layers: a medium access control (MAC) layer, a radio link control (RLC) layer, a packet data convergence protocol (PDCP) layer, a radio resource control (RRC) layer, and a non-access stratum (NAS).

Manner 5: Services are distinguished based on a bit state in a first bit field in DCI, that is, different services are distinguished by using different bit state values. For example, a first bit field is one bit, a first bit state is 0, a second bit state is 1, the first bit state corresponds to the eMBB service type, and the second bit state corresponds to the URLLC service type.

Manner 6: Services are distinguished based on a start and length indicator value (SLIV) or downlink symbol configuration index corresponding to a PDSCH, that is, different services are distinguished by using different SLIV sets or different downlink symbol configuration index sets. A PDSCH configuration list (allocation list) is configured for the terminal device, and includes a plurality of downlink symbol configuration indexes, and one downlink symbol configuration index includes SLIV information, an offset K0, and a PDSCH transmission type. The SLIV information may be used to determine index information of a start downlink symbol and a quantity of consecutive downlink symbols. The PDSCH transmission type includes a Type A PDSCH and a Type B PDSCH. The offset K0 may be an offset from a time domain resource for a PDCCH on which DCI is located to a time domain resource for a PDSCH indicated by the DCI. A time domain resource corresponding to the offset K0 may be a slot, a half-slot (for example, in a unit of seven symbols), or a symbol group, and the symbol group includes one or more symbols. Further, for example, a first downlink symbol configuration index set corresponds to the eMBB service, and a second downlink symbol configuration index set corresponds to the URLLC service. It may be understood that, in this case, HARQ information corresponding to a PDSCH corresponding to at least one downlink symbol configuration in the first downlink symbol configuration index set belongs to a first HARQ codebook, and HARQ information corresponding to a PDSCH corresponding to at least one downlink symbol configuration in the second downlink symbol configuration index set belongs to a third HARQ codebook.

Manner 7: Services are distinguished based on an offset K1 corresponding to a PDSCH, that is, different services are distinguished by using different offset K1 sets. The offset K1 is an offset from a time domain resource on which the PDSCH is located to a time domain resource on which HARQ information corresponding to the PDSCH is located. A time domain resource corresponding to the offset K1 may be a slot, a half-slot (for example, in a unit of seven symbols), or a symbol group, and the symbol group includes one or more symbols. Further, for example, a first K1 set corresponds to the eMBB service, and a second K1 set corresponds to the URLLC service. It may be understood that, in this case, HARQ information corresponding to a PDSCH corresponding to the first K1 set belongs to a first HARQ codebook, and HARQ information corresponding to a PDSCH corresponding to the second K1 set belongs to a third HARQ codebook. For example, the first K1 set is {4, 5, 6, 7}, and the second K1 set is {0, 1, 2, 3}. Optionally, values of K1 in the second K1 set are all less than values of K1 in the first K1 set.

Manner 8: Services are distinguished based on a PUCCH resource indication index corresponding to a PDSCH, that is, different service types are distinguished by using different PUCCH resource indication index sets. One PUCCH resource indication index includes PUCCH indication information such as a start physical resource block (PRB) on which a PUCCH resource is located, a PUCCH format corresponding to the PUCCH resource, a start symbol corresponding to the PUCCH resource, and a quantity of symbols that corresponds to the PUCCH resource. Further, for example, a first PUCCH resource indication index set corresponds to the eMBB service, and a second PUCCH resource indication index set corresponds to the URLLC service. It may be understood that, in this case, HARQ information corresponding to a PDSCH corresponding to the first PUCCH resource indication index set belongs to a first HARQ codebook, and HARQ information corresponding to a PDSCH corresponding to the second PUCCH resource indication index set belongs to a third HARQ codebook. For example, the first PUCCH resource indication index set is {8, 9, . . . , 14, 15}, and the second PUCCH resource indication index set is {0, 1, 2, . . . , 7}. Optionally, values of PUCCH resource indication indexes in the second PUCCH resource indication index set are all less than values of PUCCH resource indication indexes in the first PUCCH resource indication index set.

Manner 9: Services are distinguished based on a PUCCH resource corresponding to a PDSCH, that is, different services are distinguished by using different PUCCH start symbol sets. A start symbol may be any one of a symbol 0 to a symbol 13. Further, for example, a first start symbol set corresponds to the eMBB service, and a second start symbol set corresponds to the URLLC service. It may be understood that, in this case, HARQ information corresponding to a PDSCH corresponding to a first PUCCH belongs to a first HARQ codebook, and a start symbol occupied by a first PUCCH resource belongs to a first symbol index set; and HARQ information corresponding to a PDSCH corresponding to a second PUCCH belongs to a third HARQ codebook, and a start symbol occupied by a second PUCCH resource belongs to a second symbol index set. For example, the first symbol index set is {8, 9, . . . , 13}, and the second symbol index set is {0, 1, . . . , 2, 7}. Optionally, values of symbol indexes in the second symbol index set are all less than values of symbol indexes in the first symbol index set.

Manner 10: Services are distinguished based on a PUCCH resource corresponding to a PDSCH, that is, different services are distinguished by using different PUCCH end symbol sets. An end symbol may be any one of a symbol 0 to a symbol 13. Further, for example, a first end symbol set corresponds to the eMBB service, and a second end symbol set corresponds to the URLLC service. It may be understood that, in this case, HARQ information corresponding to a PDSCH corresponding to a first PUCCH belongs to a first HARQ codebook, and an end symbol occupied by a first PUCCH resource belongs to a first symbol index set; and HARQ information corresponding to a PDSCH corresponding to a second PUCCH belongs to a third HARQ codebook, and an end symbol occupied by a second PUCCH resource belongs to a second symbol index set. For example, the first symbol index set is {8, 9, . . . , 13}, and the second symbol index set is {0, 1, . . . , 2, 7}. Optionally, values of symbol indexes in the second symbol index set are all less than values of symbol indexes in the first symbol index set.

Manner 11: Services are distinguished based on a PUCCH format corresponding to a PDSCH, that is, different service types are distinguished by using different PUCCH format sets. According to a current protocol, a symbol occupied for a PUCCH format 0/format 2 is a symbol 1 or a symbol 2, and symbols occupied for a PUCCH format 1, a PUCCH format 3, and a PUCCH format 4 are a symbol 4 to a symbol 14. Further, for example, a first PUCCH format corresponds to the eMBB service, and a second PUCCH format corresponds to the URLLC service. It may be understood that HARQ information corresponding to a PDSCH corresponding to a first PUCCH belongs to a first HARQ codebook, and a format of the first PUCCH is the first PUCCH format; and HARQ information corresponding to a PDSCH corresponding to a second PUCCH belongs to a third HARQ codebook, and a format of the second PUCCH is the second PUCCH format. For example, the first PUCCH format is at least one of the following: the PUCCH format 1, the PUCCH format 3, and the PUCCH format 4, and the second PUCCH format is the PUCCH format 0 and/or the PUCCH format 2.

To resolve the foregoing technical problem, an embodiment of this application provides a codebook processing method. The method is applied to a terminal device. According to the technical solution provided in this embodiment of this application, when a service has a relatively large quantity of HARQ information, transmission efficiency of another type of service that is more important can be prevented from being affected. A specific processing procedure is as follows:

Step 201: Obtain a transmission parameter corresponding to a first HARQ codebook set.

The first HARQ codebook set includes a first HARQ codebook, the first HARQ codebook includes HARQ information corresponding to M first channels, M is an integer, and the transmission parameter corresponding to the first HARQ codebook set is greater than a target threshold.

In an implementation, when a network device needs to send downlink data of a first service (for example, an eMBB service) to the terminal device, the network device may send DCI to the terminal device. The DCI carries indication information such as a time-frequency domain resource occupied by and/or a modulation scheme of a first channel corresponding to the first service. After receiving the DCI, the terminal device may receive the first channel on the time-frequency domain resource occupied by the first channel, where the first channel carries the downlink data of the first service. After receiving the downlink data on the first channel, the terminal device may decode the downlink data, and obtain, based on a decoding result, HARQ information corresponding to the first channel. Then, the terminal device may generate a HARQ codebook (namely, the first HARQ codebook) based on HARQ information corresponding to M first channels corresponding to the first service, where M is an integer.

Optionally, when the first channels meet a first condition, the terminal device performs a method for reducing or deleting the first HARQ codebook in this embodiment of this application. In this application, reduction of the first HARQ codebook may be understood as: When the transmission parameter corresponding to the first HARQ codebook set is greater than the target threshold, the terminal device may generate a second HARQ codebook based on the first HARQ codebook, and a quantity of bits of the second HARQ codebook is less than a quantity of bits of the first HARQ codebook, to implement the reduction. Further, the terminal device sends the second HARQ codebook to the network device, in other words, sends a second HARQ codebook set, and no longer sends the first HARQ codebook to the network device. In this application, deletion or discarding of the first HARQ codebook may be understood as: When the transmission parameter corresponding to the first HARQ codebook set is greater than the target threshold, the terminal device no longer sends the first HARQ codebook, and the terminal device deletes the first HARQ codebook from the first HARQ codebook set if the first HARQ codebook set includes a plurality of HARQ codebooks. It may be understood that after the first HARQ codebook is deleted, a bit arrangement sequence of a remaining HARQ codebook may remain unchanged, or may be changed according to another rule. This is not limited in this application. When the first channels do not meet the first condition, the method for reducing or deleting the first HARQ codebook in this embodiment of this application is not performed. A reason is as follows: It may be understood that if the first channels meet the first condition, it is proved that the HARQ information corresponding to the first channels should avoid affecting transmission efficiency of another important service; but if the first channels do not meet the first condition and it may be further proved that the service on the first channels is an important service, there is no need to avoid affecting transmission efficiency of another service. Therefore, to distinguish between different services, the first condition may be considered as:

DCI corresponding to the M first channels corresponding to the first service includes at least one of the following: a format of the DCI includes a first DCI format, an RNTI scrambling the DCI includes a first RNTI, a search space in which the DCI is located includes a first search space, or a control resource set in which the DCI is located includes a first control resource set; and/or the M first channels corresponding to the first service include at least one of the following: downlink symbol configuration indexes corresponding to the first channels belong to a first downlink symbol configuration index set, indexes of start symbols on which the first channels are located belong to a first symbol index set, indexes of end symbols on which the first channels are located belong to the first symbol index set, quantities of symbols occupied by the first channels belong to a first quantity-of-symbols set, offsets corresponding to the first channels belong to a first offset set, or the offsets are offsets from time domain resources on which the first channels are located to time domain resources on which the HARQ information corresponding to the first channels is located; and/or an uplink channel that carries the HARQ information and that corresponds to the M first channels corresponding to the first service includes at least one of the following: a resource of the uplink channel belongs to a first uplink channel resource set (for example, a start symbol on which the uplink channel is located belongs to the first symbol index set, or an end symbol on which the uplink channel is located belongs to the first symbol index set), a resource indication index of the uplink channel belongs to a first uplink channel resource indication index set, or a format of the uplink channel includes a first physical uplink control channel PUCCH format. Specific descriptions have been provided by using examples in any one of the foregoing manner 1 to manner 11 in which a terminal device implicitly distinguishes between different services based on a PDSCH and HARQ information corresponding to the PDSCH. Details are not described herein again.

Optionally, the first HARQ codebook set further includes a third HARQ codebook, and the third HARQ codebook includes HARQ information corresponding to H second channels, where H is an integer.

In an implementation, similarly, when the network device needs to send downlink data of a second service (for example, a URLLC service) to the terminal device, the network device may send DCI to the terminal device. The DCI carries indication information such as a time-frequency domain resource occupied by and/or a modulation scheme of a second channel corresponding to the second service. After receiving the DCI, the terminal device may receive the second channel on the time-frequency domain resource occupied by the second channel, where the second channel carries the downlink data of the second service. After receiving the downlink data on the second channel, the terminal device may decode the downlink data, and obtain, based on a decoding result, HARQ information corresponding to the second channel. Then, the terminal device may generate a HARQ codebook (namely, the third HARQ codebook) based on HARQ information corresponding to H second channels corresponding to the second service, where H is an integer.

Optionally, when the first HARQ codebook set further includes the third HARQ codebook, the terminal device performs the method for reducing or deleting the first HARQ codebook in this application. When the first HARQ codebook set does not include the third HARQ codebook, the method for reducing or deleting the first HARQ codebook in this application is not performed. A reason is as follows: It may be understood that in this case, there is no service that is more important and that is being transmitted, and therefore, there is no need to avoid affecting transmission efficiency of another service. It may be understood herein that, that the third HARQ codebook is included means that the second channel corresponding to the second service exists. Therefore, to distinguish between different services, DCI corresponding to the H second channels includes at least one of the following: a format of the DCI includes a second DCI format, an RNTI scrambling the DCI includes a second RNTI, a search space in which the DCI is located includes a second search space, or a control resource set in which the DCI is located includes a second control resource set; and/or the H second channels include at least one of the following: downlink symbol configuration indexes corresponding to the second channels belong to a second downlink symbol configuration index set, indexes of start symbols on which the second channels are located belong to a second symbol index set, indexes of end symbols on which the second channels are located belong to the second symbol index set, quantities of symbols occupied by the second channels belong to a second quantity-of-symbols set, offsets corresponding to the second channels belong to a second offset set, or the offsets are offsets from time domain resources on which the second channels are located to time domain resources on which the HARQ information corresponding to the second channels is located; and/or an uplink channel that carries the HARQ information and that corresponds to the H second channels corresponding to the second service includes at least one of the following: a resource of the uplink channel belongs to a second uplink channel resource set (for example, a start symbol on which the uplink channel is located belongs to the second symbol index set, or an end symbol on which the uplink channel is located belongs to the second symbol index set), a resource indication index of the uplink channel belongs to a second uplink channel resource indication index set, or a format of the uplink channel includes a second PUCCH format. Specific descriptions have been provided by using examples in any one of the foregoing manner 1 to manner 11 in which a terminal device implicitly distinguishes between different services based on a PDSCH and HARQ information corresponding to the PDSCH. Details are not described herein again.

The terminal device may obtain the transmission parameter corresponding to the first HARQ codebook set. The transmission parameter corresponding to the first HARQ codebook set may be sent by the network device to the terminal device, or may be calculated by the terminal device based on the first HARQ codebook set. Optionally, after determining the first HARQ codebook set, the terminal device obtains the transmission parameter corresponding to the first HARQ codebook set. The first HARQ codebook set includes at least the first HARQ codebook, and may further include another codebook, for example, the third HARQ codebook. This is not limited in this application.

Optionally, the transmission parameter corresponding to the first HARQ codebook set may be one of the following: the quantity of bits of the first HARQ codebook, a sum of quantities of bits of all HARQ codebooks in the first HARQ codebook set, a ratio of the quantity of bits of the first HARQ codebook to a sum of quantities of bits of all HARQ codebooks in the first HARQ codebook set, a ratio of a time-frequency resource occupied by the first HARQ codebook to a time-frequency resource occupied by the first HARQ codebook set, a ratio of a time-frequency resource occupied by the first HARQ codebook to a time-frequency resource occupied by an uplink channel that carries the first HARQ codebook set, or a ratio of a time-frequency resource occupied by the first HARQ codebook set to a time-frequency resource occupied by an uplink channel that carries the first HARQ codebook set.

The terminal device may pre-store the target threshold, and the target threshold may be set by a skilled person based on experience. Alternatively, the target threshold may be notified by the network device by using higher layer signaling or DCI. After obtaining the transmission parameter corresponding to the first HARQ codebook set, the terminal device may further determine whether the transmission parameter corresponding to the first HARQ codebook set is greater than the target threshold. If the transmission parameter corresponding to the first HARQ codebook set is greater than the target threshold, perform step 102. If the transmission parameter corresponding to the first HARQ codebook set is less than or equal to the target threshold, it may be considered that the method for reducing or deleting the first HARQ codebook in this application is not performed.

Step 202: Generate the second HARQ codebook based on the first HARQ codebook or delete the first HARQ codebook from the first HARQ codebook set.

The quantity of bits of the second HARQ codebook is less than the quantity of bits of the first HARQ codebook.

In an implementation, if the transmission parameter corresponding to the first HARQ codebook set is greater than the target threshold, the terminal device may determine that when the first HARQ codebook of the first service has a relatively large amount of information, transmission efficiency of another type of service that is more important is affected. Then, the terminal device may delete the first HARQ codebook from the first HARQ codebook set, or the terminal device may generate the second HARQ codebook based on the first HARQ codebook. The quantity of bits of the second HARQ codebook is less than the quantity of bits of the first HARQ codebook. Further, the second HARQ codebook set is generated by using the second HARQ codebook. In this way, the first HARQ codebook is deleted from the first HARQ codebook set, or the second HARQ codebook is generated based on the first HARQ codebook, so that it can be ensured that a transmission parameter corresponding to the obtained second HARQ codebook set is less than or equal to the target threshold, to avoid affecting transmission efficiency of another type of service that is more important. It may be understood that, the target threshold in this application is a determining criterion for determining whether another type of service that is more important is affected. If a transmission parameter is greater than the target threshold, it is considered that another type of service that is more important is affected. If a transmission parameter is less than or equal to the target threshold, it may be considered that another type of service that is more important is not affected.

Optionally, when the second HARQ codebook set includes the second HARQ codebook, the transmission parameter corresponding to the second HARQ codebook set is less than or equal to the target threshold. The transmission parameter corresponding to the second HARQ codebook set is the quantity of bits of the second HARQ codebook, a sum of quantities of bits of all HARQ codebooks in the second HARQ codebook set, a ratio of the quantity of bits of the second HARQ codebook to a sum of quantities of bits of all HARQ codebooks in the second HARQ codebook set, a ratio of a time-frequency resource occupied by the second HARQ codebook to a time-frequency resource occupied by the second HARQ codebook set, a ratio of a time-frequency resource occupied by the second HARQ codebook to a time-frequency resource occupied by an uplink channel that carries the second HARQ codebook set, or a ratio of a time-frequency resource occupied by the second HARQ codebook set to a time-frequency resource occupied by an uplink channel that carries the second HARQ codebook set.

Optionally, the first HARQ codebook set is carried on a third channel. The third channel may be a PUCCH or a PUSCH.

In an implementation, the terminal device may send the first HARQ codebook set or the second HARQ codebook set to the network device on the third channel. The third channel may be an uplink channel corresponding to the first service, or may be an uplink channel corresponding to the second service. If the transmission parameter corresponding to the first HARQ codebook set is less than or equal to the target threshold, the terminal device sends the first HARQ codebook set to the network device on the third channel. If the transmission parameter corresponding to the first HARQ codebook set is greater than the target threshold, the terminal device sends the second HARQ codebook set to the network device on the third channel. In this case, the transmission parameter corresponding to the second HARQ codebook set is less than or equal to the target threshold.

Optionally, when the third channel is an uplink channel corresponding to another service, the terminal device performs the method for reducing or deleting the first HARQ codebook in this application. When the third channel is the uplink channel corresponding to the first service, the method for reducing or deleting the first HARQ codebook in this application is not performed. A reason is as follows: It may be understood that in this case, there is no service that is more important and that is being transmitted on the third channel, and therefore, there is no need to avoid affecting transmission efficiency of another service. Therefore, to distinguish between different services, DCI corresponding to the third channel includes at least one of the following: a format of the DCI includes a third DCI format, an RNTI scrambling the DCI includes a third RNTI, a search space in which the DCI is located includes a third search space, or a control resource set in which the DCI is located includes a third control resource set; and/or the third channel includes at least one of the following: an uplink symbol configuration index corresponding to the third channel belongs to a first uplink symbol configuration index set, an index of a start symbol on which the third channel is located belongs to a third symbol index set, an index of an end symbol on which the third channel is located belongs to the third symbol index set, a quantity of symbols occupied by the third channel belongs to a third quantity-of-symbols set, the third channel is a configured grant channel, an offset corresponding to the third channel belongs to a third offset set, or the offset corresponding to the third channel is an offset from a time domain resource on which the DCI corresponding to the third channel is located to a time domain resource on which the third channel is located.

Specifically, for example, the third DCI format is a DCI format 0_2, where a quantity of bits in the DCI format 0_2 is less than or equal to a quantity of bits in a DCI format 0_0 by any bit value ranging from 10 bits to 16 bits. For example, the third RNTI may be an MCS-C-RNTI and/or a CS-RNTI. For example, the third search space is a UE-specific search space. For example, a second PUCCH resource indication index set is $\{0, 1, 2, \ldots, 7\}$.

It should be noted that there may be various manners in which the terminal device generates the second HARQ codebook based on the first HARQ codebook. This embodiment of this application provides several feasible implementations, and the implementations are specifically as follows:

Implementation A1: The terminal device may group the M first channels into N first channel groups, and generate the second HARQ codebook based on the N first channel groups. A specific processing process is as follows:

Step A1-1: Group the M first channels into the N first channel groups, where the N first channel groups are obtained by grouping the M first channels based on first parameters.

Optionally, all first channels in each of the N first channel groups correspond to a same first parameter. For example, a first parameter corresponding to each first channel in a first channel group #1 is a slot 1, and a first parameter corresponding to each first channel in a first channel group #2 is a slot 2.

Optionally, first parameters corresponding to all first channels in each of the N first channel groups correspond to a same first parameter set. For example, the first parameter set is {slot 1, slot 2}, a first parameter corresponding to a part of first channels in a first channel group #1 is the slot 1, and a first parameter corresponding to the other part of first channels in the first channel group #1 is the slot 2.

In an implementation, the terminal device may group the M first channels into the N first channel groups based on the first parameters corresponding to the M first channels. All first channels in each of the N first channel groups correspond to a same first parameter or a same first parameter set.

Optionally, the first parameters corresponding to the M first channels include at least one of the following:
the DCI for scheduling the first channels;
frequency domain resources occupied by the first channels;

time domain resources occupied by the first channels; or information carried on the first channels.

In an implementation, the terminal device may group the M first channels into the N first channel groups based on the DCI for scheduling the first channels. Specifically, one piece of DCI may indicate one or two transport blocks, and the first channel groups may be obtained through grouping based on the DCI, where the two transport blocks are transmitted on a same time-frequency resource or different time-frequency resources. For example, if first DCI indicates a transport block 1 and a transport block 2, second DCI indicates a transport block 3 and a transport block 4, and third DCI indicates a transport block 5, the terminal device may group a first channel corresponding to the transport block 1 and the transport block 2 into a first channel group 1, group a first channel corresponding to the transport block 3 and the transport block 4 into a first channel group 2, and group a first channel corresponding to the transport block 5 into a first channel group 3, in other words, the terminal device groups the M first channels into three first channel groups.

For example, the terminal device may group the M first channels into the N first channel groups based on one of the following: the DCI format, a format of an RNTI for scrambling the DCI, the search space in which the DCI is located, or the control resource set in which the DCI is located. For a specific grouping manner, refer to the foregoing example. For example, first channels corresponding to a same DCI format are grouped into one first channel group.

For example, the terminal device may group the M first channels into the N first channel groups based on the frequency domain resources occupied by the first channels. The frequency domain resource occupied by the first channel may be a serving cell, or may be a bandwidth part (BWP). It may be understood that when a plurality of serving cells or a plurality of BWPs are configured for the terminal device, the terminal device performs grouping based on the serving cells and/or the BWPs. For example, a frequency domain resource occupied by a first channel 1 is a first serving cell, a frequency domain resource occupied by a first channel 2 is the first serving cell, and a frequency domain resource occupied by a first channel 3 is a second serving cell. In this case, the first channel 1 and the first channel 2 are grouped into one first channel group, and the first channel 3 is grouped into another first channel group.

For example, the terminal device may group the M first channels into the N first channel groups based on the time domain resources occupied by the first channels. The time domain resource occupied by the first channel may be one or more slots, or one or more symbols. For example, the terminal device may group a plurality of first channels included in one slot into one first channel group. For example, a time domain resource occupied by a first channel 1 is a first slot, a time domain resource occupied by a first channel 2 is the first slot, and a time domain resource occupied by a first channel 3 is a second slot. In this case, the first channel 1 and the first channel 2 are grouped into one first channel group, and the first channel 3 is grouped into another first channel group. For another example, the terminal device may group a plurality of first channels corresponding to a same symbol length or a same symbol length set into one first channel group. For example, a time domain resource occupied by a first channel 1 is two symbols, a time domain resource occupied by a first channel 2 is four symbols, and a time domain resource occupied by a first channel 3 is 14 symbols. In this case, the first channel 1 and the first channel 2 are grouped into one first channel group (corresponding to a symbol set {two symbols, four symbols, seven symbols}), and the first channel 3 is grouped into another first channel group (corresponding to a symbol set {14 symbols}).

The terminal device may group the M first channels into the N first channel groups based on the information carried on the first channels. The terminal device may group a plurality of first channels corresponding to a same transport block into one first channel group. For example, if a transport block 1 corresponds to a first channel 1 and a first channel 2, and a transport block 2 corresponds to a first channel 3 and a first channel 4, the terminal device may group the first channel 1 and the first channel 2 into one first channel group, and group the first channel 3 and the first channel 4 into another first channel group.

Step A1-2: Determine, based on HARQ information corresponding to a first channel included in each first channel group, HARQ information corresponding to each first channel group.

In an implementation, after grouping the M first channels into the N first channel groups, the terminal device may further determine, based on the HARQ information corresponding to the first channel included in each first channel group, the HARQ information corresponding to each first channel group. It may be understood that a quantity of bits of the HARQ information corresponding to each first channel group is less than a sum of quantities of bits of the HARQ information corresponding to all first channels in each first channel group. In this way, the first HARQ codebook is reduced.

Optionally, the N first channel groups include a target first channel group, and a processing process in which the terminal device determines, based on the HARQ information corresponding to the first channel included in each of the N first channel groups, the HARQ information corresponding to each first channel group is: If HARQ information corresponding to each first channel included in the target first channel group is an acknowledgement ACK, HARQ information corresponding to the target first channel group is an ACK. If HARQ information corresponding to any first channel included in the target first channel group is a negative acknowledgement NACK, HARQ information corresponding to the target first channel group is a NACK.

In an implementation, for the target first channel group in the N first channel groups, the terminal device may determine whether the HARQ information corresponding to each first channel included in the target first channel group is an ACK. If the HARQ information corresponding to each first channel included in the target first channel group is an ACK, the HARQ information corresponding to the target first channel group is an ACK. If the HARQ information corresponding to the any first channel included in the target first channel group is a NACK, the HARQ information corresponding to the target first channel group is a NACK.

It should be noted that, for the HARQ information corresponding to the first channel, 1 may be used to represent the ACK, and 0 may be used to represent the NACK. Alternatively, the terminal device may directly perform an AND operation on the HARQ information corresponding to the first channel included in the target first channel group, and use an operation result as the HARQ information corresponding to the target first channel group. For example, HARQ information corresponding to five first channels included in the target first channel group is {1, 1, 1, 1, 0}, and a result of performing an AND operation on the HARQ information corresponding to the five first channels is 0. In this case, the HARQ information corresponding to the target first channel group is a NACK. For another example, HARQ information corresponding to five first channels included in the target first channel group is {1, 1, 1, 1, 1}, and a result of performing an AND operation on the HARQ information corresponding to the five first channels is 1. In this case, the HARQ information corresponding to the target first channel group is an ACK.

Step A1-3: Generate the second HARQ codebook based on HARQ information corresponding to at least one of the N first channel groups.

In an implementation, after determining the HARQ information corresponding to each first channel group, the terminal device may further generate the second HARQ codebook based on the HARQ information corresponding to the at least one of the N first channel groups.

Implementation A2: The terminal device may alternatively generate the second HARQ codebook based on code block groups corresponding to the M first channels. A specific processing process is as follows: The M first channels include a target first channel that carries HARQ information corresponding to a plurality of code block groups, a transport block corresponding to the target first channel includes the plurality of code block groups, and the terminal device generates the second HARQ codebook based on HARQ information corresponding to the target first channel that carries HARQ information corresponding to the transport block.

For example, one transport block may be divided into a maximum of four code block groups (CBG). If the terminal device is configured by using higher layer signaling to perform CBG-based feedback, a quantity of bits of HARQ information corresponding to one transport block is a quantity of CBGs. If the terminal device is not configured by using higher layer signaling to perform CBG-based feedback, a quantity of bits of HARQ information corresponding to one transport block is 1. Based on the foregoing descriptions, the terminal device may fall back the CBG-based feedback to transport block (TB)-based feedback, that is, change a quantity of bits of HARQ information corresponding to the transport block on the target first channel from the quantity of CBGs to one bit.

Implementation A3: The terminal device may alternatively generate the second HARQ codebook based on priorities of the M first channels. A specific processing process is as follows:

Step A3-1: Determine, based on second parameters corresponding to the M first channels, priorities of the HARQ information corresponding to the M first channels that is included in the first HARQ codebook.

In an implementation, the terminal device may determine, based on the second parameters corresponding to the M first channels, the priorities of the HARQ information corresponding to the M first channels that is included in the first HARQ codebook.

Optionally, the second parameters corresponding to the M first channels include at least one of the following:
the offsets corresponding to the first channels, where the offsets are the offsets from the time domain resources on which the first channels are located to the time domain resources on which the HARQ information corresponding to the first channels is located;
the frequency domain resources occupied by the first channels;
the downlink symbol configuration indexes corresponding to the first channels; or
the time domain resources occupied by the first channels.

In an implementation B1, the terminal device may determine, based on offsets K1, the priorities of the HARQ information corresponding to the M first channels that is included in the first HARQ codebook. The offsets are the offsets from the time domain resources on which the first channels are located to the time domain resources on which the HARQ information corresponding to the first channels is located. The time domain resource may be a slot, or may be a half-slot, or may be one or more symbols. This is not limited in this application.

Optionally, a larger value of K1 indicates a higher priority of HARQ information. To be specific, a smaller value of K1 corresponds to a lower priority of HARQ information, and a larger value of K1 corresponds to a higher priority of HARQ information. In an implementation method, the terminal device sequentially discards the HARQ information in the first HARQ codebook based on the value of K1. Assuming that values of K1 are {1, 2, 3, 4, 5, 6, 7, 8}, the terminal device first discards HARQ information of a first channel corresponding to K1=1, and then determines whether the transmission parameter of the second HARQ codebook set is greater than the target threshold. If the transmission parameter of the second HARQ codebook set is still greater than the target threshold, the terminal device further discards HARQ information of a first channel corresponding to K1=2. The rest can be deduced by analogy until the transmission parameter of the second HARQ codebook set is less than or equal to the target threshold.

Optionally, a smaller value of K1 indicates a higher priority of HARQ information. To be specific, a smaller value of K1 corresponds to a higher priority of HARQ information, and a larger value of K1 corresponds to a lower priority of HARQ information. In an implementation method, the terminal device sequentially discards the HARQ information in the first HARQ codebook based on the value of K1. Assuming that values of K1 include {1, 2, 3, 4, 5, 6, 7, 8}, the terminal device first discards HARQ information of a first channel corresponding to K1=8, and then determines whether the transmission parameter of the second HARQ codebook set is greater than the target threshold. If the transmission parameter of the second HARQ codebook set is still greater than the target threshold, the terminal device further discards HARQ information of a first channel corresponding to K1=7. The rest can be deduced by analogy until the transmission parameter of the second HARQ codebook set is less than or equal to the target threshold.

In an implementation B2, the terminal device may alternatively determine, based on the frequency domain resources, the priorities of the HARQ information corresponding to the M first channels that is included in the first HARQ codebook. The frequency domain resource includes an index of a serving cell in which the first channel is located, an index of a BWP in which the first channel is located, and a quantity of resource blocks (RB) on which the first channel is located.

Optionally, a larger frequency domain resource index indicates a higher priority of HARQ information. To be specific, a smaller frequency domain resource index corresponds to a lower priority, and a larger frequency domain resource index corresponds to a higher priority. In an implementation method, the terminal device sequentially discards the HARQ information in the first HARQ codebook based on a value of the frequency domain resource index. Assuming that indexes of serving cells in which the first channels are located include {0, 1, 2}, the terminal device first discards HARQ information of a first channel corresponding to a serving cell index 0, and then determines whether the transmission parameter of the second HARQ codebook set is greater than the target threshold. If the transmission parameter of the second HARQ codebook set is still greater than the target threshold, the terminal device further discards HARQ information of a first channel corresponding to a serving cell index=1. The rest can be deduced by analogy until the transmission parameter of the second HARQ codebook set is less than or equal to the target threshold. In this implementation, the serving cell index may be replaced with the BWP index. Therefore, details are not described herein again.

Optionally, a smaller frequency domain resource index indicates a higher priority of HARQ information. To be specific, a larger frequency domain resource index corresponds to a lower priority of HARQ information, and a smaller frequency domain resource index corresponds to a higher priority of HARQ information. In an implementation method, the terminal device sequentially discards the HARQ information in the first HARQ codebook based on a value of the frequency domain resource index. Assuming that indexes of serving cells in which the first channels are located include {0, 1, 2}, the terminal device first discards HARQ information of a first channel corresponding to a serving cell index=2, and then determines whether the transmission parameter of the second HARQ codebook set is greater than the target threshold. If the transmission parameter of the second HARQ codebook set is still greater than the target threshold, the terminal device further discards HARQ information of a first channel corresponding to a serving cell index=1. The rest can be deduced by analogy until the transmission parameter of the second HARQ codebook set is less than or equal to the target threshold. It may be understood that usually, an index of a primary serving cell is 0, and HARQ information of the primary serving cell is more important. Therefore, ensuring transmission in the primary serving cell helps ensure service continuity of the terminal device. As a result, a smaller index ensures the service continuity of the terminal device.

In an implementation B3, the terminal device may alternatively determine, based on types of serving cells on the frequency domain resources, the priorities of the HARQ information corresponding to the M first channels that is included in the first HARQ codebook. The types of the cells include a primary serving cell, a primary secondary serving cell, and a secondary cell. For example, a priority of the primary serving cell (PCell) is higher than that of the primary secondary serving cell (PS Cell), and the priority of the primary secondary serving cell is higher than that of the secondary cell (S Cell). It may be understood that the primary serving cell is usually a cell for transmitting important information. In this way, service continuity in the primary serving cell for transmitting the important information can be preferentially ensured.

In an implementation B4, the terminal device may alternatively determine, based on quantities of frequency domain resources, the priorities of the HARQ information corresponding to the M first channels that is included in the first HARQ codebook.

Optionally, a larger quantity of frequency domain resources indicates a higher priority of HARQ information. To be specific, a smaller quantity of frequency domain resources corresponds to a lower priority of HARQ information, and a larger quantity of frequency domain resources corresponds to a higher priority of HARQ information. In an implementation, the terminal device sequentially discards the HARQ information in the first HARQ codebook based on a value of the quantity of frequency domain resources. Assuming that there are three first channels, and quantities that are of frequency domain resources and that correspond to the first channels are respectively {2, 10, 50}, the terminal device first discards HARQ information of a first channel corresponding to the quantity of frequency domain resources=2, and then determines whether the transmission parameter of the second HARQ codebook set is greater than the target threshold. If the transmission parameter of the second HARQ codebook set is still greater than the target threshold, the terminal device further discards HARQ information of a first channel corresponding to the quantity of frequency domain resources=10. The rest can be deduced by analogy until the transmission parameter of the second HARQ codebook set is less than or equal to the target threshold. It may be understood that if HARQ information corresponding to a first channel that uses a large quantity of frequency domain resources is discarded, the network device performs retransmission for the terminal device even if the terminal device correctly receives the first channel. However, a quantity of frequency domain resources that need to be used to retransmit the first channel is close to or greater than a quantity of frequency domain resources used before, causing a waste of system resources.

Optionally, a smaller quantity of frequency domain resources indicates a higher priority of HARQ information. To be specific, a larger quantity of frequency domain resources corresponds to a lower priority of HARQ information, and a smaller quantity of frequency domain resources corresponds to a higher priority of HARQ information. In an implementation, the terminal device sequentially discards the HARQ information in the first HARQ codebook based on a value of the quantity of frequency domain resources. Assuming that there are three first channels, and quantities that are of frequency domain resources and that correspond to the first channels are respectively {2, 10, 50}, the terminal device first discards HARQ information of a first channel corresponding to the quantity of frequency domain resources=50, and then determines whether the transmission parameter of the second HARQ codebook set is greater than the target threshold. If the transmission parameter of the second HARQ codebook set is still greater than the target threshold, the terminal device further discards HARQ information of a first channel corresponding to the quantity of frequency domain resources=10. The rest can be deduced by analogy until the transmission parameter of the second HARQ codebook set is less than or equal to the target threshold.

In an implementation B5, the terminal device may alternatively determine, based on the downlink symbol configuration indexes, the priorities of the HARQ information corresponding to the M first channels that is included in the first HARQ codebook.

Optionally, a larger downlink symbol configuration index indicates a higher priority of HARQ information. To be specific, a downlink symbol configuration index with a smaller value corresponds to a lower priority of HARQ information, and a downlink symbol configuration index with a larger value corresponds to a higher priority of HARQ information. In an implementation, the terminal device sequentially discards the HARQ information in the first HARQ codebook based on a value of the downlink symbol configuration index. Assuming that values of the downlink symbol configuration indexes are {0, 1, 2, 3, 4, 5, 6, 7, 8, 9, 10, 11, 12, 13, 14, 15}, the terminal device first discards HARQ information of a first channel corresponding to a downlink symbol configuration index whose value is 0, and then determines whether the transmission parameter of the second HARQ codebook set is greater than the target threshold. If the transmission parameter of the second HARQ codebook set is still greater than the target threshold, the terminal device further discards HARQ information of a first channel corresponding to a downlink symbol configuration index whose value is 1. The rest can be deduced by analogy until the transmission parameter of the second HARQ codebook set is less than or equal to the target threshold.

Optionally, a downlink symbol configuration index with a smaller value indicates a higher priority of HARQ information. To be specific, a downlink symbol configuration index with a larger value corresponds to a lower priority of HARQ information, and a downlink symbol configuration index with a smaller value corresponds to a higher priority of HARQ information. In an implementation, the terminal device sequentially discards the HARQ information in the first HARQ codebook based on a value of the downlink symbol configuration index. Assuming that values of the downlink symbol configuration indexes are {0, 1, 2, 3, 4, 5, 6, 7, 8, 9, 10, 11, 12, 13, 14, 15}, the terminal device first discards HARQ information of a first channel corresponding to a downlink symbol configuration index whose value is 15, and then determines whether the transmission parameter of the second HARQ codebook set is greater than the target threshold. If the transmission parameter of the second HARQ codebook set is still greater than the target threshold, the terminal device further discards HARQ information of a first channel corresponding to a downlink symbol configuration index whose value is 14. The rest can be deduced by analogy until the transmission parameter of the second HARQ codebook set is less than or equal to the target threshold.

In an implementation B6, the terminal device may alternatively determine, based on the time domain resources, the priorities of the HARQ information corresponding to the M first channels that is included in the first HARQ codebook. The time domain resource includes a start symbol index, an end symbol index, and a quantity of symbols.

Optionally, a larger time domain resource (a larger start symbol index or a larger end symbol index) indicates a higher priority of HARQ information. To be specific, a symbol index with a smaller value corresponds to a lower priority of HARQ information, and a symbol index with a larger value corresponds to a higher priority of HARQ information. In an implementation, the terminal device sequentially discards the HARQ information in the first HARQ codebook based on a value of the symbol index. Assuming that values of indexes are {0, 1, 2, 3, 4, 5, 6, 7, 8, 9, 10, 11, 12, 13}, the terminal device first discards HARQ information of a first channel corresponding to a symbol index whose value is 0, and then determines whether the transmission parameter of the second HARQ codebook set is greater than the target threshold. If the transmission parameter of the second HARQ codebook set is still greater than the target threshold, the terminal device further discards HARQ information of a first channel corresponding to a symbol index whose value is 1. The rest can be deduced by analogy until the transmission parameter of the second HARQ codebook set is less than or equal to the target threshold.

Optionally, a smaller time domain resource (a smaller start symbol index or a smaller end symbol index) indicates a higher priority of HARQ information. To be specific, a symbol index with a larger value corresponds to a lower priority of HARQ information, and a symbol index with a smaller value corresponds to a higher priority of HARQ information. In this case, the terminal device sequentially discards the HARQ information in the first HARQ codebook based on a value of the symbol index. Assuming that values of indexes are {0, 1, 2, 3, 4, 5, 6, 7, 8, 9, 10, 11, 12, 13}, the terminal device first discards HARQ information of a first channel corresponding to a symbol index whose value is 13, and then determines whether the transmission parameter of the second HARQ codebook set is greater than the target threshold. If the transmission parameter of the second HARQ codebook set is still greater than the target threshold, the terminal device further discards HARQ information of a first channel corresponding to a symbol index whose value is 12. The rest can be deduced by analogy until the transmission parameter of the second HARQ codebook set is less than or equal to the target threshold.

Optionally, a larger time domain resource indicates a higher priority of HARQ information. To be specific, a smaller time domain length corresponds to a lower priority of HARQ information, and a larger time domain length corresponds to a higher priority of HARQ information. In an implementation, the terminal device sequentially discards the HARQ information in the first HARQ codebook based on a value of the time domain length. Assuming that values of time domain lengths are {2, 3, 4, 5, 6, 7, 8, 9, 10, 11, 12, 13, 14}, the terminal device first discards HARQ information of a first channel corresponding to the time domain length=2, and then determines whether the transmission parameter of the second HARQ codebook set is greater than the target threshold. If the transmission parameter of the second HARQ codebook set is still greater than the target threshold, the terminal device further discards HARQ information of a first channel corresponding to the time domain length=3. The rest can be deduced by analogy until the transmission parameter of the second HARQ codebook set is less than or equal to the target threshold.

Optionally, a smaller time domain resource indicates a higher priority of HARQ information. To be specific, a larger time domain length corresponds to a lower priority of HARQ information, and a smaller time domain length corresponds to a higher priority of HARQ information. In an implementation, the terminal device sequentially discards the HARQ information in the first HARQ codebook based on a value of the time domain length. Assuming that values of time domain lengths are {2, 3, 4, 5, 6, 7, 8, 9, 10, 11, 12, 13, 14}, the terminal device first discards HARQ information of a first channel corresponding to the time domain length=14, and then determines whether the transmission parameter of the second HARQ codebook set is greater than the target threshold. If the transmission parameter of the second HARQ codebook set is still greater than the target threshold, the terminal device further discards HARQ information of a first channel corresponding to the time domain length=13. The rest can be deduced by analogy until the transmission parameter of the second HARQ codebook set is less than or equal to the target threshold.

It may be understood that the foregoing implementations B1 to B6 may be separately used, or may be used in combination. In a possible implementation, the terminal device may alternatively combine the foregoing plurality of manners to perform comprehensive determining, to ensure that the priorities corresponding to the HARQ information are finally selected. The following describes in detail a method for combining the plurality of manners, and the method may include the following steps:

Step 1: The terminal device sorts, in a manner A, the HARQ information corresponding to the M first channels or the HARQ information corresponding to the N first channel groups.

Step 2: If one piece of the foregoing HARQ information corresponds to one priority, the terminal device determines a priority sequence of the HARQ information in the manner A. If a plurality of pieces of the foregoing HARQ information correspond to one priority, the terminal device does not consider the manner corresponding to step 1, but may sort HARQ information priorities of the plurality of pieces of HARQ information in a manner B other than the manner corresponding to step 1. If one priority in a new priority sequence includes a plurality of pieces of HARQ information, step 1 is re-performed until it is determined that a case in which a plurality of pieces of HARQ information correspond to one priority does not exist or determining manners are all used. It may be understood that, each manner is used only once to select a plurality of pieces of HARQ information corresponding to a same priority. After a manner is used once, one or more of other manners that have not been used for determining are used to determine the priorities of the HARQ information. It may be understood that, after the determining manners are all used, if there are still a plurality of pieces of HARQ information corresponding to a same priority, the plurality of pieces of HARQ information have the same priority. If the terminal device needs to discard HARQ information corresponding to the priority, the terminal device discards all the HARQ information with the same priority.

It should be understood that the manner A is different from the manner B.

Step A3-2: Generate the second HARQ codebook based on the priorities of the HARQ information corresponding to the M first channels.

In an implementation, the terminal device obtains the priorities of the HARQ information corresponding to the M first channels, and may generate the second HARQ codebook based on the priorities of the HARQ information corresponding to the M first channels.

Optionally, the terminal device may discard, in ascending order of the priorities of the HARQ information corresponding to the M first channels that is included in the first HARQ codebook, HARQ information corresponding to S first channels in the M first channels, and generate the second HARQ codebook. The second HARQ codebook includes HARQ information corresponding to a first channel in the M first channels other than the S first channels.

Alternatively, the terminal device may generate the second HARQ codebook in descending order of the priorities of the HARQ information corresponding to the M first channels that is included in the first HARQ codebook. HARQ information corresponding to S first channels that is in the first HARQ codebook is reserved in the second HARQ codebook. M is greater than S, and M and S are integers.

In an implementation, after determining the priorities of the HARQ information corresponding to the M first channels that is included in the first HARQ codebook, the terminal device may discard, in ascending order of the priorities of the HARQ information corresponding to the M first channels that is included in the first HARQ codebook, the HARQ information corresponding to the S first channels in the M first channels, and generate the second HARQ codebook. Alternatively, the terminal device may reserve, in descending order of the priorities of the HARQ information corresponding to the M first channels that is included in the first HARQ codebook, the HARQ information corresponding to the S first channels, and generate the second HARQ codebook.

For example, a larger value of K1 indicates a higher priority of HARQ information. To be specific, a smaller value of K1 corresponds to a lower priority of HARQ information, and a larger value of K1 corresponds to a higher priority of HARQ information. In an implementation method, the terminal device sequentially discards the HARQ information in the first HARQ codebook based on the value of K1. Assuming that values of K1 are {1, 2, 3, 4, 5, 6, 7, 8}, the terminal device first discards HARQ information of a first channel corresponding to K1=1, and then determines whether the transmission parameter of the second HARQ codebook set is greater than the target threshold. If the transmission parameter of the second HARQ codebook set is still greater than the target threshold, the terminal device further discards HARQ information of a first channel corresponding to K1=2. The rest can be deduced by analogy until the transmission parameter of the second HARQ codebook set is less than or equal to the target threshold.

Optionally, a smaller value of K1 indicates a higher priority of HARQ information. To be specific, a smaller value of K1 corresponds to a higher priority of HARQ information, and a larger value of K1 corresponds to a lower priority of HARQ information. In an implementation method, the terminal device sequentially discards the HARQ information in the first HARQ codebook based on the value of K1. Assuming that values of K1 include {1, 2, 3, 4, 5, 6, 7, 8}, the terminal device first discards HARQ information of a first channel corresponding to K1=8, and then determines whether the transmission parameter of the second HARQ codebook set is greater than the target threshold. If the transmission parameter of the second HARQ codebook set is still greater than the target threshold, the terminal device further discards HARQ information of a first channel corresponding to K1=7. The rest can be deduced by analogy until the transmission parameter of the second HARQ codebook set is less than or equal to the target threshold.

For another example, a larger value of the offset K1 indicates a higher priority of HARQ information. To be specific, a smaller value of K1 corresponds to a lower priority of HARQ information, and a larger value of K1 corresponds to a higher priority of HARQ information. In an implementation method, the terminal device sequentially reserves the HARQ information in the first HARQ codebook based on the value of K1. Assuming that values of K1 are {1, 2, 3, 4, 5, 6, 7, 8}, the terminal device first reserves HARQ information of a first channel whose offset K1 has a value of 8, and then determines whether the transmission parameter of the second HARQ codebook set is less than or equal to the target threshold. If the transmission parameter of the second HARQ codebook set is still less than or equal to the target threshold, the terminal device further reserves HARQ information of a first channel whose offset K1 has a value of 7. The rest can be deduced by analogy, and the transmission parameter of the second HARQ codebook set always remains less than or equal to the target threshold.

For another example, a larger index of a serving cell in which a first channel is located indicates a higher priority of HARQ information corresponding to the first channel, and indexes of serving cells in which eight first channels are located are {1, 2, 3, 4, 5, 6, 7, 8}. The terminal device may first discard HARQ information of a first channel whose serving cell index is 1, and then determines whether the transmission parameter of the second HARQ codebook set is greater than the target threshold. If the transmission parameter of the second HARQ codebook set is still greater than the target threshold, the terminal device further discards HARQ information of a first channel whose serving cell index is 2. The rest can be deduced by analogy until the transmission parameter of the second HARQ codebook set is less than or equal to the target threshold.

For another example, a higher priority of a serving cell indicates a higher priority of HARQ information corresponding to a first channel, the priority of the primary serving cell is higher than the priority of the primary secondary serving cell, and the priority of the primary secondary serving cell is higher than the priority of the secondary cell. The terminal device may first discard HARQ information of a first channel of the secondary cell, and then determine whether the transmission parameter of the second HARQ codebook set is greater than the target threshold. If the transmission parameter of the second HARQ codebook set is still greater than the target threshold, the terminal device further discards HARQ information of a first channel of the primary secondary serving cell. The rest can be deduced by analogy until the transmission parameter of the second HARQ codebook set is less than or equal to the target threshold.

For another example, a larger quantity of frequency domain resources indicates a higher priority of HARQ information corresponding to a first channel, and quantities of frequency domain resources of eight first channels are {2, 10, 15, 30, 44, 65, 77, 89}. The terminal device may first discard HARQ information of a first channel whose quantity of frequency domain resources is 2, and then determine whether the transmission parameter of the second HARQ codebook set is greater than the target threshold. If the transmission parameter of the second HARQ codebook set is still greater than the target threshold, the terminal device further discards HARQ information of a first channel whose quantity of frequency domain resources is 10. The rest can be deduced by analogy until the transmission parameter of the second HARQ codebook set is less than or equal to the target threshold.

For another example, a larger downlink symbol configuration index indicates a higher priority of HARQ information corresponding to a first channel, and downlink symbol configuration indexes of eight first channels are {1, 2, 3, 4, 5, 6, 7, 8}. The terminal device may first discard HARQ information of a first channel whose downlink symbol configuration index is 1, and then determine whether the transmission parameter of the second HARQ codebook set is greater than the target threshold. If the transmission parameter of the second HARQ codebook set is still greater than the target threshold, the terminal device further discards HARQ information of a first channel whose downlink symbol configuration index is 2. The rest can be deduced by analogy until the transmission parameter of the second HARQ codebook set is less than or equal to the target threshold.

For another example, a larger start symbol index indicates a higher priority of HARQ information corresponding to a first channel, and start symbol indexes of eight first channels are {1, 2, 3, 4, 5, 6, 7, 8}. The terminal device may first discard HARQ information of a first channel whose start symbol index is 1, and then determine whether the transmission parameter of the second HARQ codebook set is greater than the target threshold. If the transmission parameter of the second HARQ codebook set is still greater than the target threshold, the terminal device further discards HARQ information of a first channel whose start symbol index is 2. The rest can be deduced by analogy until the transmission parameter of the second HARQ codebook set is less than or equal to the target threshold.

For another example, a larger quantity of symbols indicates a higher priority of HARQ information corresponding to a first channel, and quantity of symbols of eight first channels are {3, 5, 7, 9, 12, 14, 16, 18}. The terminal device may first discard HARQ information of a first channel whose quantity of symbols is 3, and then determine whether the transmission parameter of the second HARQ codebook set is greater than the target threshold. If the transmission parameter of the second HARQ codebook set is still greater than the target threshold, the terminal device further discards HARQ information of a first channel whose quantity of symbols is 5. The rest can be deduced by analogy until the transmission parameter of the second HARQ codebook set is less than or equal to the target threshold.

Implementation A4: The terminal device may alternatively generate the second HARQ codebook based on the HARQ information corresponding to each first channel group. A specific processing process is as follows:

Step A4-1: Determine, based on first parameters corresponding to the N first channel groups, priorities of the HARQ information corresponding to the N first channel groups.

In an implementation, the terminal device may determine, based on the first parameters corresponding to the N first channel groups, the priorities of the HARQ information corresponding to the N first channel groups. For a specific manner of determining the priorities of the HARQ information, refer to the foregoing implementations B1 to B6. In an implementation, the M first channels may be grouped into the N first channel groups based on the first parameters, and priority sorting may be performed in each first channel group. Then, priorities of HARQ information of first channels in each first channel group may be the same, or may be determined in another implementation. In another implementation, the M first channels are grouped into the N first channel groups based on the first parameters, that is, depending on whether the transmission parameter of the first HARQ codebook set is greater than the target threshold. In this case, HARQ information of first channels corresponding to S first channel groups in the N first channel groups is discarded together.

Step A4-2: Generate the second HARQ codebook based on the priorities of the HARQ information corresponding to the N first channel groups.

In an implementation, after obtaining the priorities of the HARQ information corresponding to the N first channel groups, the terminal device may generate the second HARQ codebook based on the priorities of the HARQ information corresponding to the N first channel groups.

Optionally, the terminal device may discard, in ascending order of the priorities of the HARQ information corresponding to the N first channel groups that is included in the first HARQ codebook, HARQ information corresponding to Z first channel groups in the N first channel groups, and generate the second HARQ codebook. The second HARQ codebook includes HARQ information corresponding to a first channel group in the N channel groups other than the Z first channel groups. Alternatively, the terminal device may generate the second HARQ codebook in descending order of the priorities of the HARQ information corresponding to the N first channel groups that is included in the first HARQ codebook.

HARQ information corresponding to Z first channel groups that is in the first HARQ codebook is reserved in the second HARQ codebook. N is greater than Z.

In an implementation, after determining the priorities of the HARQ information corresponding to the N first channel groups that is included in the first HARQ codebook, the terminal device may discard, in ascending order of the priorities of the HARQ information corresponding to the N first channel groups that is included in the first HARQ codebook, the HARQ information corresponding to the Z first channel groups in the N first channel groups, and generate the second HARQ codebook. Alternatively, the terminal device may reserve, in descending order of the priorities of the HARQ information corresponding to the N first channel groups that is included in the first HARQ codebook, the HARQ information corresponding to the Z first channel groups that is in the first HARQ codebook, and generate the second HARQ codebook. The processing process in which the terminal device discards, in ascending order of the priorities of the HARQ information corresponding to the N first channel groups that is included in the first HARQ codebook, the HARQ information corresponding to the Z first channel groups in the N first channel groups, and generates the second HARQ codebook is similar to the processing process in which the terminal device discards, in ascending order of the priorities of the HARQ information corresponding to the M first channels that is included in the first HARQ codebook, the HARQ information corresponding to the S first channels in the M first channels, and generates the second HARQ codebook. Details are not described herein again. In addition, the processing process in which the terminal device reserves, in descending order of the priorities of the HARQ information corresponding to the N first channel groups that is included in the first HARQ codebook, the HARQ information corresponding to the Z first channel groups that is in the first HARQ codebook, to generate the second HARQ codebook is similar to the processing process in which the terminal device reserves, in descending order of the priorities of the HARQ information corresponding to the M first channels that is included in the first HARQ codebook, the HARQ information corresponding to the S first channels, and generates the second HARQ codebook. Details are not described herein again.

It should be noted that there may be various manners in which the terminal device determines the priorities of the HARQ information corresponding to the M first channels. The terminal device may determine the priorities based on only one second parameter, or may determine the priorities based on a plurality of second parameters. This is not limited in this application.

Optionally, the terminal device may send first capability information, where the first capability information is used to indicate that the terminal device is capable of sending the first HARQ codebook and the third HARQ codebook on one uplink channel; and/or the terminal device may alternatively receive first configuration information, where the first configuration information is used to configure that the terminal device can send the first HARQ codebook and the third HARQ codebook on one uplink channel. For example, the first HARQ codebook corresponds to the eMBB service, and the third HARQ codebook corresponds to the URLLC service. For a specific implicit definition, refer to the foregoing manner 1 to manner 11. Details are not described herein again. Optionally, after sending the first capability information, the terminal device receives second configuration information, where the second configuration information is used to configure that the terminal device cannot simultaneously send the first HARQ codebook and the third HARQ codebook on one uplink channel. This may be understood as: The method in this application is not applicable to generating the second HARQ codebook or discarding the HARQ information in the first HARQ codebook.

In an implementation, the terminal device sends capability information to the network device. After receiving the capability information, the network device may determine whether the terminal device is capable of sending the first HARQ codebook and the third HARQ codebook on one uplink channel. Similarly, the network device may alternatively send the first configuration information to the terminal device. After receiving the first configuration information, the terminal device may send the first HARQ codebook and the third HARQ codebook on one uplink channel.

Optionally, the terminal device may alternatively send second capability information, where the second capability information is used to indicate that the terminal device is capable of sending the first HARQ codebook or the second HARQ codebook on the third channel; and/or the terminal device may alternatively receive third configuration information, where the third configuration information is used to configure that the terminal device can send the first HARQ codebook or the second HARQ codebook on the third channel. Optionally, after sending the second capability information, the terminal device receives fourth configuration information, where the fourth configuration information is used to configure that the terminal device cannot send the first HARQ codebook or the second HARQ codebook on the third channel. This may be understood as: The method in this application is not applicable to generating the second HARQ codebook or discarding the HARQ information in the first HARQ codebook.

In an implementation, the terminal device sends capability information to the network device. After receiving the capability information, the network device may determine whether the terminal device is capable of sending the first HARQ codebook and the second HARQ codebook on one uplink channel. Similarly, the network device may alternatively send the third configuration information to the terminal device. After receiving the third configuration information, the terminal device may send the first HARQ codebook and the second HARQ codebook on one uplink channel.

An embodiment of this application further provides a codebook processing method, and the method is applied to a network device, to avoid affecting, when a quantity of bits of a HARQ codebook of a type of service is relatively large, processing efficiency of another type of service. A specific processing procedure is as follows:

Receive a second hybrid automatic repeat request HARQ codebook set.

The second HARQ codebook set is generated based on a first HARQ codebook set, the first HARQ codebook set includes a first HARQ codebook, the first HARQ codebook includes HARQ information corresponding to M first channels, M is an integer, a transmission parameter corresponding to the first HARQ codebook set is greater than a target threshold, the second HARQ codebook set includes a second HARQ codebook or does not include the first HARQ codebook, the second HARQ codebook is generated based on the first HARQ codebook, a quantity of bits of the second HARQ codebook is less than a quantity of bits of the first HARQ codebook, and a transmission parameter corresponding to the second HARQ codebook set is less than or equal to the target threshold.

In an implementation, when the network device needs to send downlink data of a first service (for example, an eMBB service) to a terminal device, the network device may send DCI to the terminal device. The DCI carries indication information such as a time-frequency domain resource occupied by and/or a modulation scheme of a first channel corresponding to the first service. After receiving the DCI, the terminal device may receive the first channel on the time-frequency domain resource occupied by the first channel, where the first channel carries the downlink data of the first service. After receiving the downlink data on the first channel, the terminal device may decode the downlink data, and obtain, based on a decoding result, HARQ information corresponding to the first channel. Then, the terminal device may generate a HARQ codebook (namely, the first HARQ codebook) based on HARQ information corresponding to M first channels corresponding to the first service, where M is an integer.

To distinguish between different services, DCI corresponding to the M first channels includes at least one of the following: a format of the DCI includes a first DCI format, an RNTI scrambling the DCI includes a first RNTI, a search space in which the DCI is located includes a first search space, or a control resource set in which the DCI is located includes a first control resource set; and/or the M first channels include at least one of the following: downlink symbol configuration indexes corresponding to the first channels belong to a first downlink symbol configuration index set, indexes of start symbols on which the first channels are located belong to a first symbol index set, indexes of end symbols on which the first channels are located belong to the first symbol index set, quantities of symbols occupied by the first channels belong to a first quantity-of-symbols set, offsets corresponding to the first channels belong to a first offset set, or the offsets are offsets from time domain resources on which the first channels are located to time domain resources on which the HARQ information corresponding to the first channels is located; and/or an uplink channel corresponding to the M first channels that carries the HARQ information includes at least one of the following: a resource of the uplink channel belongs to a first uplink channel resource set, a resource indication index of the uplink channel belongs to a first uplink channel resource indication index set, or a format of the uplink channel includes a first physical uplink control channel PUCCH format.

Optionally, the second HARQ codebook set further includes a third HARQ codebook. The third HARQ codebook includes HARQ information corresponding to H second channels, where H is an integer.

In an implementation, similarly, when the network device needs to send downlink data of a second service (for example, a URLLC service) to the terminal device, the network device may send DCI to the terminal device. The DCI carries indication information such as a time-frequency domain resource occupied by and/or a modulation scheme of a second channel corresponding to the second service. After receiving the DCI, the terminal device may receive the second channel on the time-frequency domain resource occupied by the second channel, where the second channel carries the downlink data of the second service. After receiving the downlink data on the second channel, the terminal device may decode the downlink data, and obtain, based on a decoding result, HARQ information corresponding to the second channel. Then, the terminal device may generate a HARQ codebook (namely, the third HARQ codebook) based on HARQ information corresponding to H second channels corresponding to the second service, where H is an integer.

Optionally, when the first HARQ codebook set further includes the third HARQ codebook, the terminal device performs a method for reducing or deleting the first HARQ codebook in this application. When the first HARQ codebook set does not include the third HARQ codebook, the method for reducing or deleting the first HARQ codebook in this application is not performed. A reason is as follows: It may be understood that in this case, there is no service that is more important and that is being transmitted, and therefore, there is no need to avoid affecting transmission efficiency of another service. It may be understood herein that, that the third HARQ codebook is included means that the second channel corresponding to the second service exists. Therefore, to distinguish between different services, DCI corresponding to the H second channels includes at least one of the following: a format of the DCI includes a second DCI format, an RNTI scrambling the DCI includes a second RNTI, a search space in which the DCI is located includes a second search space, or a control resource set in which the DCI is located includes a second control resource set; and/or the H second channels include at least one of the following: downlink symbol configuration indexes corresponding to the second channels belong to a second downlink symbol configuration index set, indexes of start symbols on which the second channels are located belong to a second symbol index set, indexes of end symbols on which the second channels are located belong to the second symbol index set, quantities of symbols occupied by the second channels belong to a second quantity-of-symbols set, offsets corresponding to the second channels belong to a second offset set, or the offsets are offsets from time domain resources on which the second channels are located to time domain resources on which the HARQ information corresponding to the second channels is located; and/or an uplink channel corresponding to the H second channels that carries the HARQ information includes at least one of the following: a resource of the uplink channel belongs to a second uplink channel resource set, a resource indication index of the uplink channel belongs to a second uplink channel resource indication index set, or a format of the uplink channel includes a second PUCCH format.

Optionally, the transmission parameter corresponding to the first HARQ codebook set is:
the quantity of bits of the first HARQ codebook;
a sum of quantities of bits of all HARQ codebooks in the first HARQ codebook set;
a ratio of the quantity of bits of the first HARQ codebook to a sum of quantities of bits of all HARQ codebooks in the first HARQ codebook set;
a ratio of a time-frequency resource occupied by the first HARQ codebook to a time-frequency resource occupied by the first HARQ codebook set;
a ratio of a time-frequency resource occupied by the first HARQ codebook to a time-frequency resource occupied by an uplink channel that carries the first HARQ codebook set; or
a ratio of a time-frequency resource occupied by the first HARQ codebook set to a time-frequency resource occupied by an uplink channel that carries the first HARQ codebook set.

Optionally, the transmission parameter corresponding to the second HARQ codebook set is:
the quantity of bits of the second HARQ codebook;
a sum of quantities of bits of all HARQ codebooks in the second HARQ codebook set;

a ratio of the quantity of bits of the second HARQ codebook to a sum of quantities of bits of all HARQ codebooks in the second HARQ codebook set;

a ratio of a time-frequency resource occupied by the second HARQ codebook to a time-frequency resource occupied by the second HARQ codebook set;

a ratio of a time-frequency resource occupied by the second HARQ codebook to a time-frequency resource occupied by an uplink channel that carries the second HARQ codebook set; or a ratio of a time-frequency resource occupied by the second HARQ codebook set to a time-frequency resource occupied by an uplink channel that carries the second HARQ codebook set.

Optionally, the second HARQ codebook set is carried on a third channel.

In an implementation, the terminal device may send the first HARQ codebook set or the second HARQ codebook set to the network device on the third channel. The third channel may be an uplink channel corresponding to the first service, or may be an uplink channel corresponding to the second service. If the transmission parameter corresponding to the first HARQ codebook set is less than or equal to the target threshold, the terminal device sends the first HARQ codebook set to the network device on the third channel. If the transmission parameter corresponding to the first HARQ codebook set is greater than the target threshold, the terminal device sends the second HARQ codebook set to the network device on the third channel. In this case, the transmission parameter corresponding to the second HARQ codebook set is less than or equal to the target threshold.

Optionally, when the third channel is an uplink channel corresponding to another service, the terminal device performs the method for reducing or deleting the first HARQ codebook in this application. When the third channel is the uplink channel corresponding to the first service, the method for reducing or deleting the first HARQ codebook in this application is not performed. A reason is as follows: It may be understood that in this case, there is no service that is more important and that is being transmitted on the third channel, and therefore, there is no need to avoid affecting transmission efficiency of another service. Therefore, to distinguish between different services, DCI corresponding to the third channel includes at least one of the following: a format of the DCI includes a third DCI format, an RNTI scrambling the DCI includes a third RNTI, a search space in which the DCI is located includes a third search space, or a control resource set in which the DCI is located includes a third control resource set; and/or the third channel includes at least one of the following: an uplink symbol configuration index corresponding to the third channel belongs to a first uplink symbol configuration index set, an index of a start symbol on which the third channel is located belongs to a third symbol index set, an index of an end symbol on which the third channel is located belongs to the third symbol index set, a quantity of symbols occupied by the third channel belongs to a third quantity-of-symbols set, the third channel is a configured grant channel, an offset corresponding to the third channel belongs to a third offset set, or the offset is an offset from a time domain resource on which the DCI corresponding to the third channel is located to a time domain resource on which the third channel is located.

It should be noted that there may be various manners of generating the second HARQ codebook based on the first HARQ codebook. This embodiment of this application provides several feasible manners, and the manners are specifically as follows:

Implementation 1: The second HARQ codebook is generated based on HARQ information corresponding to at least one of N first channel groups, the HARQ information corresponding to the at least one of the N first channel groups is determined based on HARQ information corresponding to a first channel included in the at least one of the N first channel groups, the N first channel groups are obtained after the M first channels are grouped, and each of the N first channel groups corresponds to a same first parameter.

Optionally, the N first channel groups include a target first channel group; and if HARQ information corresponding to each first channel included in the target first channel group is an acknowledgement ACK, HARQ information corresponding to the target first channel group is an ACK; or if HARQ information corresponding to any first channel included in the target first channel group is a negative acknowledgement NACK, HARQ information corresponding to the target first channel group is a NACK.

Optionally, first parameters corresponding to the M first channels include at least one of the following:

downlink control information DCI for scheduling the first channels;

frequency domain resources occupied by the first channels;

time domain resources occupied by the first channels; or information carried on the first channels.

For a definition of the first parameter herein, refer to the foregoing descriptions. Details are not described herein again.

Implementation 2: The M first channels include a target first channel that carries HARQ information corresponding to a plurality of code block groups, a transport block corresponding to the target first channel includes the plurality of code block groups, and the second HARQ codebook is generated based on HARQ information corresponding to the target first channel that carries HARQ information corresponding to the transport block.

Implementation 3: Priorities of the HARQ information corresponding to the M first channels that is included in the first HARQ codebook are determined based on second parameters corresponding to the M first channels, and the second HARQ codebook is generated based on the first HARQ codebook and the priorities of the HARQ information corresponding to the M first channels that is in the first HARQ codebook.

Optionally, the second parameters corresponding to the M first channels include at least one of the following:

offsets corresponding to the first channels, where the offsets are offsets from time domain resources on which the first channels are located to time domain resources on which the HARQ information corresponding to the first channels is located;

frequency domain resources occupied by the first channels;

downlink symbol configuration indexes corresponding to the first channels; or time domain resources occupied by the first channels.

Optionally, the second HARQ codebook includes HARQ information corresponding to a first channel in the M first channels other than S first channels, and HARQ information corresponding to the S first channels is determined based on a sequence of the priorities of the HARQ information corresponding to the M first channels that is included in the first HARQ codebook, where M is greater than S.

Implementation 4: Priorities of HARQ information corresponding to the N first channel groups are determined based on the first parameters corresponding to the N first channel groups, and the second HARQ codebook is generated based on the priorities of the HARQ information corresponding to the N first channel groups and the HARQ information corresponding to the N first channel groups.

Optionally, the second HARQ codebook includes HARQ information corresponding to a first channel group in the N channel groups other than Z first channel groups, and HARQ information corresponding to the Z first channel groups is determined based on a sequence of the priorities of the HARQ information corresponding to the N first channel groups that is included in the first HARQ codebook, where N is greater than Z.

Optionally, the network device may receive capability information, where the capability information is used to indicate that the terminal device is capable of sending the first HARQ codebook and the third HARQ codebook on one uplink channel; and/or the network device may alternatively send configuration information, where the configuration information is used to configure the terminal device to send the first HARQ codebook and the third HARQ codebook on one uplink channel.

Optionally, the network device may receive capability information, where the capability information is used to indicate that the terminal device is capable of sending the first HARQ codebook or the second HARQ codebook on the third channel; and/or the network device may alternatively send configuration information, where the configuration information is used to configure the terminal device to send the first HARQ codebook or the second HARQ codebook on the third channel.

It should be noted that a specific processing process of performing the foregoing codebook processing method by the network device is similar to the specific processing process of performing the codebook processing method by the terminal device, and details are not described herein again.

In the foregoing embodiments provided in this application, the methods provided in the embodiments of this application are described separately from perspectives of the terminal device and the network device. It may be understood that, to implement the functions in the methods provided in the embodiments of this application, the network elements, such as the terminal device and the network device, include corresponding hardware structures and/or software modules for performing the functions. A person skilled in the art should be easily aware that, in combination with algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules of the terminal device and the network device may be obtained through division based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that in the embodiments of this application, division into the modules is an example and is merely division into logical functions, and may be other division in an actual implementation.

Figure 3:
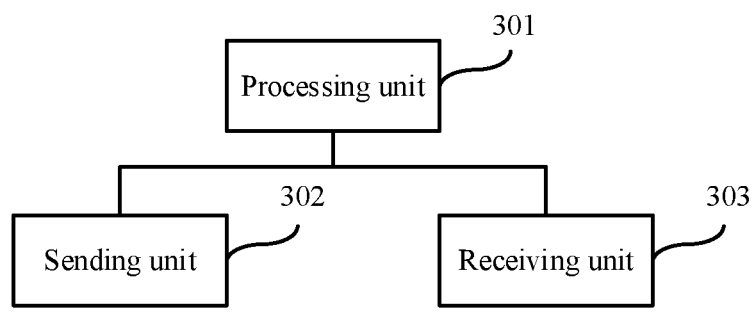
FIG. 3 is a possible example composition diagram 1 of an information indication apparatus according to an embodiment of this application.

When each functional module is obtained through division based on each corresponding function, FIG. 3 is a possible example composition diagram 1 of an information indication apparatus related to the foregoing embodiments. The information indication apparatus can perform steps performed by the terminal device in any one of the method embodiments of this application. As shown in FIG. 3, the information indication apparatus is a terminal device, or an information indication apparatus that supports the terminal device in implementing the method provided in the embodiments. For example, the information indication apparatus may be a chip system. The information indication apparatus may include a processing unit 301.

Figure 2:
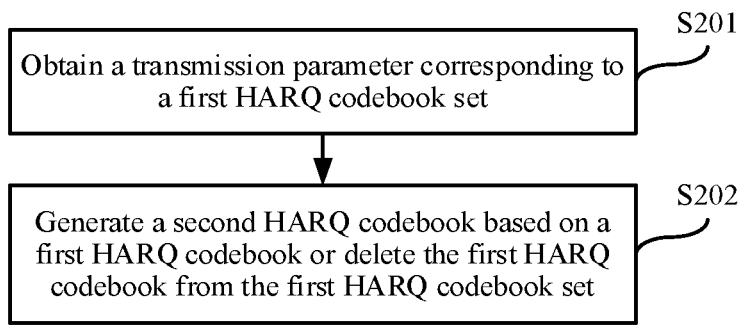
FIG. 2 is a flowchart of a codebook processing method according to an embodiment of this application.

The processing unit 301 is configured to perform or support the information indication apparatus in performing S201 and S202 in the codebook processing method shown in FIG. 2.

Further, the information indication apparatus may further include a sending unit 302 and a receiving unit 303. The sending unit 302 is configured to support the information indication apparatus in performing a step of sending capability information to a network device. The receiving unit 303 is configured to support the information indication apparatus in performing a step of receiving configuration information sent by the network device.

It should be noted that all related content of the steps in the foregoing method embodiments may be cited in function descriptions of corresponding functional modules. Details are not described herein again.

The information indication apparatus provided in this embodiment of this application is configured to perform the method in any one of the foregoing embodiments, and therefore can achieve the same effects as the method in the foregoing embodiments.

An entity device corresponding to the receiving unit 303 may be a receiver, an entity device corresponding to the sending unit 302 may be a transmitter, and an entity device corresponding to the processing unit 301 may be a processor.

Figure 4:
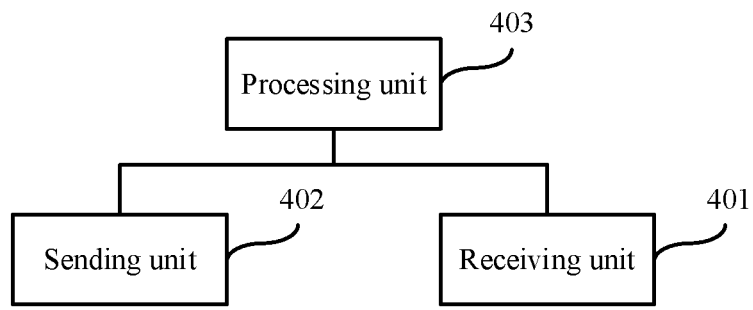
FIG. 4 is a possible example composition diagram 2 of an information indication apparatus according to an embodiment of this application.

When each functional module is obtained through division based on each corresponding function, FIG. 4 is a possible example composition diagram 2 of an information indication apparatus related to the foregoing embodiments. The information indication apparatus can perform steps performed by the network device in any one of the method embodiments of this application. As shown in FIG. 4, the information indication apparatus is a network device, or an information indication apparatus that supports the network device in implementing the method provided in the embodiments. For example, the information indication apparatus may be a chip system. The information indication apparatus may include a receiving unit 401.

The receiving unit 401 is configured to support the information indication apparatus in performing steps of receiving a second HARQ codebook set sent by a terminal device and receiving capability information sent by the terminal device.

Further, the information indication apparatus may further include a sending unit 402 and a processing unit 403. The sending unit 402 is configured to support the information indication apparatus in performing a step of sending configuration information to the terminal device.

The processing unit 403 is configured to support the information indication apparatus in performing the method described in the embodiments of this application.

It should be noted that all related content of the steps in the foregoing method embodiments may be cited in function descriptions of corresponding functional modules. Details are not described herein again.

The information indication apparatus provided in this embodiment of this application is configured to perform the method in any one of the foregoing embodiments, and therefore can achieve the same effects as the method in the foregoing embodiments.

An entity device corresponding to the receiving unit 401 may be a receiver, an entity device corresponding to the sending unit 402 may be a transmitter, and an entity device corresponding to the processing unit 403 may be a processor.

Figure 5:
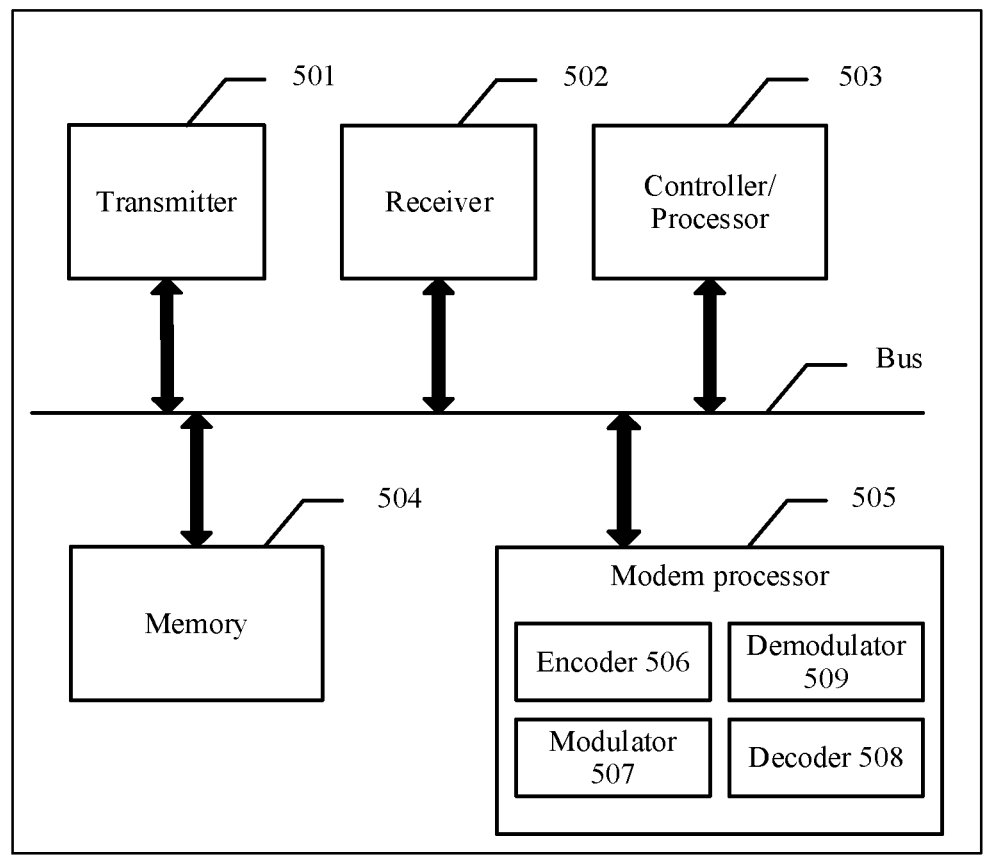
FIG. 5 is a simplified schematic diagram of a possible design structure of a codebook processing apparatus according to an embodiment of this application.

FIG. 5 is a simplified schematic diagram of a possible design structure of a codebook processing apparatus in the foregoing embodiments. The codebook processing apparatus includes a transmitter 501, a receiver 502, a controller/processor 503, a memory 504, and a modem processor 505.

The transmitter 501 is configured to send an uplink signal, where the uplink signal is transmitted to the network device in the foregoing embodiments through an antenna. On a downlink, the antenna receives a downlink signal (DCI) transmitted by the network device in the foregoing embodiments. The receiver 502 is configured to receive the downlink signal (DCI) received from the antenna. In the modem processor 505, an encoder 506 receives service data and a signaling message that are to be sent on an uplink, and processes the service data and the signaling message. A modulator 507 further processes (for example, performs symbol mapping and modulation on) the encoded service data and the encoded signaling message and provides an output sample. A demodulator 509 processes (for example, demodulates) an input sample and provides symbol estimation. A decoder 508 processes (for example, decodes) the symbol estimation and provides decoded data and a decoded signaling message that are to be sent to the terminal device. The encoder 506, the modulator 507, the demodulator 509, and the decoder 508 may be implemented by the combined modem processor 505. The units perform processing based on a radio access technology used by a radio access network.

The controller/processor 503 controls and manages an action of the terminal device and is configured to perform processing performed by the terminal device in the foregoing embodiments. For example, the controller/processor 503 is configured to obtain a transmission parameter corresponding to a first HARQ codebook set, where the first HARQ codebook set includes a first HARQ codebook, the first HARQ codebook includes HARQ information corresponding to M first channels, M is an integer, and the transmission parameter corresponding to the first HARQ codebook set is greater than a target threshold; and generate a second HARQ codebook based on the first HARQ codebook, or delete the first HARQ codebook from the first HARQ codebook set. A quantity of bits of the second HARQ codebook is less than a quantity of bits of the first HARQ codebook. For example, the controller/processor 503 is configured to support the terminal device in performing processes S201 and S202 in FIG. 2.

Figure 6:
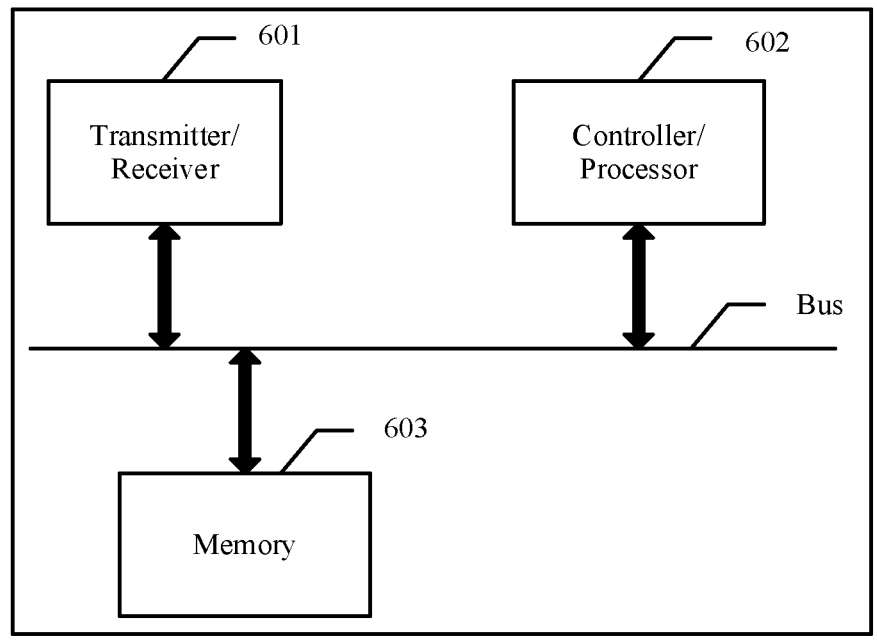
FIG. 6 is a simplified schematic diagram of a possible design structure of a codebook receiving apparatus according to an embodiment of this application.

FIG. 6 is a possible schematic structural diagram of a codebook receiving apparatus in the foregoing embodiments. The codebook receiving apparatus includes a transmitter/receiver 601, a controller/processor 602, and a memory 603. The transmitter/receiver 601 is configured to support information receiving and sending between a network device and the terminal device in the foregoing embodiments. The controller/processor 602 performs various functions for communicating with the terminal device. On an uplink, an uplink signal from the terminal device is received through an antenna, is demodulated by the receiver 601, and is further processed by the controller/processor 162 to restore service data and signaling information that are sent by the terminal device. On a downlink, service data and a signaling message are processed by the controller/processor 602 and are demodulated by the transceiver 601 to generate a downlink signal, and the downlink signal is transmitted to the terminal device through the antenna. The memory 603 is configured to store program code and data of the network device.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor, any conventional processor, or the like. The steps of the methods disclosed with reference to the embodiments of this application may be directly performed by a hardware processor, or may be performed by using a combination of hardware in the processor and a software module.

In the embodiments of this application, the memory may be a non-volatile memory, for example, a hard disk drive (HDD) or a solid-state drive (SSD), or may be a volatile memory, for example, a random access memory (RAM). The memory is any other medium that can be configured to carry or store expected program code in a form of instructions or a data structure and that can be accessed by a computer, but is not limited thereto. The memory in the embodiments of this application may alternatively be a circuit or any other apparatus that can implement a storage function, and is configured to store program instructions and/or data.

The foregoing descriptions about the implementations allow a person skilled in the art to clearly understand that, for the purpose of convenient and brief description, division into the foregoing functional modules is merely used as an example for illustration. In an actual application, the foregoing functions can be allocated to different functional modules and implemented as required. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, the division into modules or units is merely division into logical functions and there may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, that is, may be located in one place, or may be distributed on a plurality of different places. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

All or some of the foregoing methods in the embodiments of this application may be implemented by using software, hardware, firmware, or any combination thereof. When being implemented by using the software, all or some of the methods may be implemented in a form of a computer program product. The computer program product includes one or more computer instructions. When the computer program instructions are loaded and executed on a computer, all or some of the procedures or the functions according to the embodiments of this application are generated. The computer may be a general-purpose computer, a special-purpose computer, a computer network, a network device, a terminal, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, applied to a terminal device, the method comprising:
    obtaining a transmission parameter corresponding to a first hybrid automatic repeat request (HARQ) codebook set, wherein the first HARQ codebook set comprises a first HARQ codebook comprising HARQ information corresponding to M first channels, wherein M is an integer, and the transmission parameter is greater than a target threshold; and
    either generating a second HARQ codebook based on the first HARQ codebook, wherein a quantity of bits of the second HARQ codebook is less than a quantity of bits of the first HARQ codebook, or deleting the first HARQ codebook from the first HARQ codebook set, wherein the transmission parameter is one of a quantity of bits of the first HARQ codebook, a sum of quantities of bits of all HARQ codebooks in the first HARQ codebook set, a ratio of the quantity of bits of the first HARQ codebook to a sum of quantities of bits of all HARQ codebooks in the first HARQ codebook set, a ratio of a time-frequency resource occupied by the first HARQ codebook to a time-frequency resource occupied by the first HARQ codebook set, a ratio of the time-frequency resource occupied by the first HARQ codebook to a time-frequency resource occupied by an uplink channel that carries the first HARQ codebook set, or a ratio of the time-frequency resource occupied by the first HARQ codebook set to a time-frequency resource occupied by the uplink channel that carries the first HARQ codebook set.

2. The method according to claim 1, wherein generating the second HARQ codebook based on the first HARQ codebook comprises:
    determining, based on HARQ information corresponding to a first channel comprised in each of N first channel groups, HARQ information corresponding to each first channel group of the N first channel groups, wherein the N first channel groups are obtained by grouping the M first channels based on first parameters or first parameter sets; and
    generating the second HARQ codebook based on HARQ information corresponding to at least one of the N first channel groups.

3. The method according to claim 2, wherein the N first channel groups comprise a target first channel group, and wherein determining, based on the HARQ information corresponding to the first channel comprised in each of the N first channel groups, the HARQ information corresponding to each first channel group comprises:
    if HARQ information corresponding to each first channel comprised in the target first channel group is an acknowledgement (ACK), the HARQ information corresponding to the target first channel group is an ACK; or
    if HARQ information corresponding to any first channel comprised in the target first channel group is a negative acknowledgement (NACK), the HARQ information corresponding to the target first channel group is a NACK.

4. The method according to claim 1, wherein the M first channels comprise a target first channel that carries HARQ information corresponding to a plurality of code block groups, a transport block corresponding to the target first channel comprises the plurality of code block groups, and generating the second HARQ codebook based on the first HARQ codebook comprises:
    generating the second HARQ codebook based on HARQ information corresponding to the target first channel that carries HARQ information corresponding to the transport block.

5. The method according to claim 1, wherein generating the second HARQ codebook based on the first HARQ codebook comprises:
    determining, based on second parameters corresponding to the M first channels, priorities of the HARQ information corresponding to the M first channels; and
    generating the second HARQ codebook based on the priorities of the HARQ information corresponding to the M first channels.

6. The method according to claim 5, wherein generating the second HARQ codebook based on the priorities of the HARQ information corresponding to the M first channels comprises:

discarding, in an ascending order of the priorities of the HARQ information corresponding to the M first channels, HARQ information corresponding to S first channels in the M first channels, and generating the second HARQ codebook, wherein the second HARQ codebook comprises HARQ information corresponding to a first channel in the M first channels other than the S first channels; or generating the second HARQ codebook in a descending order of the priorities of the HARQ information corresponding to the M first channels, wherein the HARQ information corresponding to the S first channels that is in the first HARQ codebook is reserved in the second HARQ codebook, wherein M is greater than S.

7. An apparatus comprising:
one or more processors; and
a non-transitory computer readable medium storing a program to be executed by the one or more processors, the program comprising instructions for:
  obtaining a transmission parameter corresponding to a first hybrid automatic repeat request (HARQ) codebook set, wherein the first HARQ codebook set comprises a first HARQ codebook, the first HARQ codebook comprises HARQ information corresponding to M first channels, M is an integer, and the transmission parameter corresponding to the first HARQ codebook set is greater than a target threshold; and
  either generating a second HARQ codebook based on the first HARQ codebook, wherein a quantity of bits of the second HARQ codebook is less than a quantity of bits of the first HARQ codebook, or deleting the first HARQ codebook from the first HARQ codebook set, wherein the transmission parameter is one of a quantity of bits of the first HARQ codebook, a sum of quantities of bits of all HARQ codebooks in the first HARQ codebook set, a ratio of the quantity of bits of the first HARQ codebook to a sum of quantities of bits of all HARQ codebooks in the first HARQ codebook set, a ratio of a time-frequency resource occupied by the first HARQ codebook to a time-frequency resource occupied by the first HARQ codebook set, a ratio of the time-frequency resource occupied by the first HARQ codebook to a time-frequency resource occupied by an uplink channel that carries the first HARQ codebook set, or a ratio of the time-frequency resource occupied by the first HARQ codebook set to a time-frequency resource occupied by the uplink channel that carries the first HARQ codebook set.

8. The apparatus according to claim 7, wherein generating the second HARQ codebook based on the first HARQ codebook comprises:
  determining, based on HARQ information corresponding to a first channel comprised in each of N first channel groups, HARQ information corresponding to each first channel group of the N first channel groups, wherein the N first channel groups are obtained by grouping the M first channels based on first parameters or first parameter sets; and
  generating the second HARQ codebook based on HARQ information corresponding to at least one of the N first channel groups.

9. The apparatus according to claim 8, wherein the N first channel groups comprise a target first channel group, and wherein determining, based on the HARQ information corresponding to the first channel comprised in each of the N first channel groups, the HARQ information corresponding to each first channel group comprises:
  if HARQ information corresponding to each first channel comprised in the target first channel group is an acknowledgement (ACK), the HARQ information corresponding to the target first channel group is an ACK; or
  if HARQ information corresponding to any first channel comprised in the target first channel group is a negative acknowledgement (NACK), the HARQ information corresponding to the target first channel group is a NACK.

10. The apparatus according to claim 7, wherein the M first channels comprise a target first channel that carries HARQ information corresponding to a plurality of code block groups, a transport block corresponding to the target first channel comprises the plurality of code block groups, and generating the second HARQ codebook based on the first HARQ codebook comprises:
  generating the second HARQ codebook based on HARQ information corresponding to the target first channel that carries HARQ information corresponding to the transport block.

11. The apparatus according to claim 7, wherein the generating the second HARQ codebook based on the first HARQ codebook comprises:
  determining, based on second parameters corresponding to the M first channels, priorities of the HARQ information corresponding to the M first channels; and
  generating the second HARQ codebook based on the priorities of the HARQ information corresponding to the M first channels.

12. The apparatus according to claim 11, wherein generating the second HARQ codebook based on the priorities of the HARQ information corresponding to the M first channels comprises:
  discarding, in an ascending order of the priorities of the HARQ information corresponding to the M first channels, HARQ information corresponding to S first channels in the M first channels, and generating the second HARQ codebook, wherein the second HARQ codebook comprises HARQ information corresponding to a first channel in the M first channels other than the S first channels; or
  generating the second HARQ codebook in a descending order of the priorities of the HARQ information corresponding to the M first channels, wherein the HARQ information corresponding to the S first channels that is in the first HARQ codebook is reserved in the second HARQ codebook, wherein M is greater than S.

13. An apparatus comprising:
one or more processors; and
a non-transitory computer readable medium storing a program to be executed by the one or more processors, the program comprising instructions for:
  receiving a first hybrid automatic repeat request (HARQ) codebook set, wherein the first HARQ codebook set is generated based on a second HARQ codebook set, the second HARQ codebook set comprises a first HARQ codebook, the first HARQ codebook comprises HARQ information corresponding to M first channels, M is an integer, a transmission parameter corresponding to the second HARQ codebook set is greater than a target threshold, the first HARQ codebook set comprises a second HARQ codebook or does not comprise the first HARQ codebook, the second HARQ codebook is generated based on the first HARQ codebook, a quantity of bits of the second HARQ codebook is less than a quantity of bits of the first HARQ codebook, and a transmission parameter corresponding to the first HARQ codebook set is less than or equal to the target threshold, wherein the transmission parameter is one of a quantity of bits of the first HARQ codebook, a sum of quantities of bits of all HARQ codebooks in the first HARQ codebook set, a ratio of the quantity of bits of the first HARQ codebook to a sum of quantities of bits of all HARQ codebooks in the first HARQ codebook set, a ratio of a time-frequency resource occupied by the first HARQ codebook to a time-frequency resource occupied by the first HARQ codebook set, a ratio of the time-frequency resource occupied by the first HARQ codebook to a time-frequency resource occupied by an uplink channel that carries the first HARQ codebook set, or a ratio of the time-frequency resource occupied by the first HARQ codebook set to a time-frequency resource occupied by the uplink channel that carries the first HARQ codebook set.

14. The apparatus according to claim 13, wherein the second HARQ codebook is generated based on HARQ information corresponding to at least one of N first channel groups, the HARQ information corresponding to the at least one of the N first channel groups is determined based on HARQ information corresponding to a first channel comprised in the at least one of the N first channel groups, the N first channel groups are obtained after the M first channels are grouped, and each of the N first channel groups corresponds to a same first parameter or a same first parameter set.

15. The apparatus according to claim 14, wherein the N first channel groups comprise a target first channel group; and
   if HARQ information corresponding to each first channel comprised in the target first channel group is an acknowledgement ACK, HARQ information corresponding to the target first channel group is an ACK; or
   if HARQ information corresponding to any first channel comprised in the target first channel group is a negative acknowledgement NACK, HARQ information corresponding to the target first channel group is a NACK.

16. The apparatus according to claim 13, wherein the M first channels comprise a target first channel that carries HARQ information corresponding to a plurality of code block groups, a transport block corresponding to the target first channel comprises the plurality of code block groups, and the second HARQ codebook is generated based on HARQ information corresponding to the target first channel that carries HARQ information corresponding to the transport block.

17. The apparatus according to claim 13, wherein priorities of the HARQ information corresponding to the M first channels are determined based on second parameters corresponding to the M first channels, and the second HARQ codebook is generated based on the first HARQ codebook and the priorities of the HARQ information corresponding to the M first channels that is in the first HARQ codebook.

18. The apparatus according to claim 17, wherein the second HARQ codebook comprises HARQ information corresponding to a first channel in the M first channels other than S first channels, and HARQ information corresponding to the S first channels is determined based on a sequence of the priorities of the HARQ information corresponding to the M first channels, wherein M is greater than S.

* * * * *